US008219572B2

(12) United States Patent
Ghosh et al.

(10) Patent No.: US 8,219,572 B2
(45) Date of Patent: Jul. 10, 2012

(54) SYSTEM AND METHOD FOR SEARCHING ENTERPRISE APPLICATION DATA

(75) Inventors: Rajesh Ghosh, Kalyani (IN); Vikas Soolapani, Calicut (IN)

(73) Assignee: Oracle International Corporation, Redwood Shores, CA (US)

( * ) Notice: Subject to any disclaimer, the term of this patent is extended or adjusted under 35 U.S.C. 154(b) by 382 days.

(21) Appl. No.: 12/201,308

(22) Filed: Aug. 29, 2008

(65) Prior Publication Data

US 2010/0057702 A1    Mar. 4, 2010

(51) Int. Cl.
G06F 7/00    (2006.01)
(52) U.S. Cl. ......... 707/758; 707/694; 707/688; 709/223
(58) Field of Classification Search ............... 707/758, 707/694, 668; 709/200, 223
See application file for complete search history.

(56) References Cited

U.S. PATENT DOCUMENTS

| | | | |
|---|---|---|---|
| 6,629,097 | B1 | 9/2003 | Keith |
| 7,155,715 | B1 | 12/2006 | Cui et al. |
| 7,249,100 | B2 | 7/2007 | Murto et al. |
| 7,426,526 | B2 | 9/2008 | Chen et al. |
| 7,761,480 | B2 | 7/2010 | Toledano et al. |
| 7,827,169 | B2 | 11/2010 | Enenkiel |
| 2002/0174117 | A1 | 11/2002 | Nykanen |
| 2004/0098358 | A1 | 5/2004 | Roediger |
| 2004/0213409 | A1 | 10/2004 | Murto et al. |
| 2005/0182792 | A1 | 8/2005 | Israel et al. |
| 2005/0234889 | A1 | 10/2005 | Fox et al. |
| 2006/0048155 | A1 | 3/2006 | Wu et al. |
| 2006/0053098 | A1 | 3/2006 | Gardner et al. |
| 2006/0053172 | A1 | 3/2006 | Gardner et al. |
| 2006/0165040 | A1 | 7/2006 | Rathod et al. |
| 2006/0184617 | A1 | 8/2006 | Nicholas et al. |
| 2007/0038609 | A1 | 2/2007 | Wu |
| 2007/0055691 | A1 | 3/2007 | Statchuk |
| 2007/0106933 | A1 | 5/2007 | Nene et al. |
| 2007/0150387 | A1 | 6/2007 | Seubert et al. |
| 2007/0162467 | A1 | 7/2007 | Wolber et al. |
| 2007/0192351 | A1* | 8/2007 | Liu et al. ................ 707/102 |
| 2007/0208697 | A1 | 9/2007 | Subramaniam et al. |
| 2007/0226242 | A1 | 9/2007 | Wang et al. |
| 2007/0239674 | A1 | 10/2007 | Gorzela |
| 2007/0299813 | A1 | 12/2007 | Subramaniam et al. |
| 2008/0005194 | A1 | 1/2008 | Smolen et al. |
| 2008/0021881 | A1 | 1/2008 | Subramaniam et al. |
| 2008/0091448 | A1 | 4/2008 | Niheu et al. |
| 2008/0126476 | A1 | 5/2008 | Nicholas et al. |

(Continued)

OTHER PUBLICATIONS

Oracle, "Classification, Clustering and Information Visualization with Oracle Text, An Oracle White Paper," Feb. 2003.

(Continued)

*Primary Examiner* — Don Wong
*Assistant Examiner* — Tuan-Hanh Phan
(74) *Attorney, Agent, or Firm* — Kilpatrick Townsend & Stockton LLP

(57) ABSTRACT

A search modeling tool is provided that can communicate with multiple enterprise applications to create object definitions describing searchable data stored in each application. The object definitions may be used to extract searchable data from the applications, thus allowing for manipulation of the data in formats usable for text searching, user presentation, and other applications. The search modeler may interface with each application using common protocols, allowing for generalization of object definitions and subsequent crawling across a variety of enterprise applications.

20 Claims, 12 Drawing Sheets

U.S. PATENT DOCUMENTS

| | | | |
|---|---|---|---|
| 2008/0133960 | A1 | 6/2008 | Wong et al. |
| 2008/0168420 | A1 | 7/2008 | Sabbouh |
| 2008/0183674 | A1 | 7/2008 | Bush et al. |
| 2008/0215519 | A1 | 9/2008 | Runge et al. |
| 2008/0275844 | A1 | 11/2008 | Buzsaki et al. |
| 2009/0077094 | A1 | 3/2009 | Bodain |
| 2009/0150735 | A1 | 6/2009 | Israel et al. |
| 2009/0292685 | A1 | 11/2009 | Liu et al. |
| 2010/0010974 | A1 | 1/2010 | Chieu et al. |
| 2010/0017606 | A1 | 1/2010 | Bradley et al. |
| 2010/0070496 | A1 | 3/2010 | Ghosh |
| 2010/0070517 | A1 | 3/2010 | Ghosh et al. |
| 2010/0185643 | A1 | 7/2010 | Rao et al. |
| 2010/0228782 | A1 | 9/2010 | Rao et al. |

OTHER PUBLICATIONS

Oracle, "Information Visualization with Oracle 10g Text, An Oracle White Paper," Oct. 2005.
Oracle, "Text Mining with Oracle Text, An Oracle White Paper," Apr. 2005.
Oracle, "Oracle Text, An Oracle Technical White Paper," Jun. 2007.
Oracle Technology Network, "Business Components for Java (BC4J) Feature Overview,".
Steve Muench, "Building a Web Store with Struts & BC4J Frameworks," Oracle Technology Framework, Sep. 2003.
Fast, "Powering Enterprise Search with Fast ESP", 2008.
Fast, "Fast ESP™, The World's Most Intelligent, Secure, High-Performance Search Platform," 2008 (#1, 2 pages).
Fast, "Fast ESP™, The World's Most Intelligent, Secure, High-Performance Search Platform," 2008 (#2, 7 pages).
Fast, "Fast ESP," available at http://www.fastsearch.com/13a.aspx?m=1031 (last visited Sep. 10, 2008).
Fast, "Search on Structured Data," available at http://www.fastsearch.com/13a.aspx?m=1104 (last visited Sep. 10, 2008).
Autonomy, "Automatic Classification and Taxonomy Generation," available at http://www.autonomy.com/content/Functionality/idol-functionality-categorization/index.en.html (last visited Sep. 10, 2008).
Autonomy, "Conceptual Search, "available at http://www.autonomy.com/content/Functionality/idol-functionality-conceptual-search/index.en.html (last visited Sep. 10, 2008).
Autonomy, "Natural Language Processing (NLP)," available at http://www.autonomy.com/content/Functionality/idol-functionality-nlp/index.en.html (last visited Sep. 10, 2008).
Autonomy, "IDOL Server," available at http://www.autonomy.com/content/Products/products-idol-server/index.en.html (last visited Sep. 10, 2008).
Oracle, "New Query Features in Secure Enterprise Search 10.1.8.2, An Oracle White Paper," Oct. 2007.
Xavier Lopez, "Developing Semantic Web Applications using the Oracle Database 10g RDF Data Model," presented at Oracle Open World.
Oracle, "Oracle® Database, Semantic Technologies Developer's Guide, 11g Release 1 (11.1)," B28397-02, Sep. 2007.
Oracle USA Inc., "RDF Support in Oracle".
Oracle, "Oracle® Secure Enterprise Search, Administrator's Guide, 10g Release 1 (10.1.8.2)," E10418-01, Sep. 2007.
OracleOwlPrime, "From Owl," Jan. 24, 2008.
Oracle, "Semantic Data Integration for the Enterprise, An Oracle White Paper," Jul. 2007.
Oracle, "New Features in Oracle Text with Oracle Database 11g Release 1, An Oracle White Paper," May 2007.
"POS Tagging XML with xGrid and the Stanford Log-linear Part-of-Speech Tagger," available at http://www.stanford.edu/~mjockers/cgi-bin/digHum/tagging/postaggingxml.html.
Searching Enterprise Applications (Siebel 7.8 and e-Business Suite 11i) with Oracle Secure Enterprise Search 10.1.8, an Oracle White Paper, Jan. 2007.
Oracle, "Searching Oracle Content Server (Stellent) with Oracle Secure Enterprise Search 10.1.8, An Oracle White Paper," Sep. 2007.
Oracle, "Secure Enterprise Search, One Search Across Your Enterprise Repositories: Comprehensive, Secure, and Easy to Use," Jan. 2007.
Oracle, "Secure Enterprise Search, Version 10.1.8.2 Data Sheet".
Oracle, "Secure Searching with Oracle Secure Enterprise Search, an Oracle White Paper," Jan. 2007.
Oracle, "Secure Enterprise Search, Version 10.1.8.2, An Oracle Technical White Paper," Oct. 2007.
Oracle, "Secure Enterprise Search, Version 1 (10.1.8), An Oracle Technical White Paper," Jan. 2007.
The Stanford Natural Language Processing Group, "Stanford Log-Linear Part-of-Speech Tagger," Jun. 6, 2008.
W3C, "Resource Description Framework (RFD): Concepts and Abstract Syntax," Feb. 10, 2004.
W3C, "Owl Web Ontology Language Reference," Feb. 10, 2004.
W3C, "RDF Primer," Feb. 10, 2004.
W3C, "RDF Semantics," Feb. 10, 2004.
W3C, "SPARQL Query Language for RFD," Jan. 15, 2008.
W3C, "RDF/XML Syntax Specification (Revised)," Feb. 10, 2004.
W3C, "RDF Test Cases," Feb. 10, 2004.
W3C, "RDF Vocabolary Description Language 1.0: RDF Schema," Feb. 10, 2004.
Oracle Technology Network, "Oracle Business Components for Java, An Oracle Technical White Paper".
Oracle, "Oracle 9i, XML Developer's Kits Guide—XDK, Release 2 (9.2)," Mar. 2002.
Alonso, et al., "Oracle Secure Enterprise Search 10g", An Oracle Technical White Paper, Mar. 2006, 20 pages.
Ford, et al., "Secure Searching with Oracle Secure Enterprise Search," An Oracle White Paper, Mar. 2006, 14 pages.
Google, "Enterprise Solutions: Google Search Appliance" [webpage], downloaded from the Internet: <<http://www.google.com/enterprise/gsa/>>, 2 pages.
Risvik, et al., "Search Engines and Web Dynamics," Computer Networks, 39(3):289-302, 2002.
"Oracle® Spatial," Resource Description Framework (RDF), 1Og Release 2 (10.2), B19207-01, Jul. 2005, 62 pages.
U.S. Appl. No. 12/356,314, filed Jan. 20, 2009, Notice of Allowance dated 1122-2011, 7 pages.
Author Unknown, "Jena Adaptor Release 2.0 for Oracle Database—README," Jena, Aug. 2008, 9 pages.
Author Unknown, "Oracle Database 11g Release 2 Semantic Technologies Using the Jena Adaptor for Oracle Database," Oracle Corporation, 2009, 24 pages.
Author Unknown, "Semantic Technologies Center," Oracle Corporation, [online], [retrieved on Dec. 29, 2009]. Retrieved from: http://www.oracle.com/technology/tech/semantic_technologies/index.html?_template=/oc.
Author Unknown, "SPARQL Protocol for RDF," W3C, [online], 2008, [retrieved on Aug 16, 2011]. Retrieved from: http://www.w3.org/TR/2008/REC-rdf-sparql-protocol-20080115/.
Author Unknown, "Web Services Description Language (WSDI) Version 2.0: RDF Mapping", W3C, [online], 2007, [retrieved on Aug. 16, 2011]. Retrieved from: http://www.w3.org/TR/2007/NOTE-wsdl20-rdf-20070626/.
Bechhofer, S., et al, "OWL Web Ontology Language Reference", W3C, [online], 2004, [retrieved on Aug. 16, 2011]. Retrieved from: http://w3.org/TR/2004/REC-wol-ref-20040210/.
Dickinson, I., "Jena Ontology API", Jena.Sourceforge.net, [online], 2009, [retrieved on Aug. 16, 2011]. Retrieved from: http://jena.sourceforge.net/ontology/index.html.
McBride, B., "An Introduction to RDF and the Jena RDF API", Jena.Sourceforge.net., [online], 2010 [retrieved on Aug. 16, 2011]. Retrieved from: http://jena.sourceforge.net/tutorial/RDF_API/index.html.
Munsinger, L., et al., "Oracle Application Development Framework Overview," Oracle Corporation, 2006, 11 pages.
Pollock, J., "A Semantic Web Business Case", W3C, 2008, 6 pages.
Sirin, E., et al., "Pellet: A Practical OWL-DL Reasoner", [online], [retrieved on Aug. 16, 2011]. Retrieved from: http://www.mindswap.org/papers/PelletJWS.pdf.
Wu, Z., et al., "Oracle Semantic Technologies Inference Best Practices with RDFS/OWL", Oracle Corporation, 2009, 11 pages.

U.S. Appl. No. 11/742,961, filed May 1, 2007, Notice of Allowance dated Mar. 9, 2010, 7 pages.
U.S. Appl. No. 11/742,961, filed May 1, 2007, Final Office Action dated Dec. 31, 2009, 23 pages.
U.S. Appl. No. 11/742,961, filed May 1, 2007, Office Action dated Jun. 22, 2009, 22 pages.
U.S. Appl. No. 12/210,420, filed Sep. 15, 2008, Final Office Action dated Nov. 9, 2011, 20 pages.
U.S. Appl. No. 12/210,420, filed Sep. 15, 2008, Office Action dated Apr. 6, 2011, 15 pages.
U.S. Appl. No. 12/212,178, filed Sep. 17, 2008, Advisory Action dated Nov. 2, 2011, 3 pages.
U.S. Appl. No. 12/212,178, filed Sep. 17, 2008, Final Office Action dated Aug. 25, 2011, 18 pages.
U.S. Appl. No. 12/212,178, filed Sep. 17, 2008, Office Action dated Jan. 21, 2011, 17 pages.
U.S. Appl. No. 12/393,872, filed Feb. 26, 2009, Final Office Action dated Aug. 16, 2011, 2 pages.
U.S. Appl. No. 12/393,872, filed Feb. 26, 2009, Office Action dated Mar. 2, 2011, 8 pages.
U.S. Appl. No. 12/356,314, filed Jan. 20, 2009, Office Action dated Jul. 22, 2011, 10 pages.

* cited by examiner

FIG. 7

Searchable Objects

Search

Product Family
Name
Product
Display Name

705

[Go] [Clear]

Searchable Objects

View By [Searchable Objects ▼] [Create Searchable Object]

| Object Display Name | Object Description | Product Family | Product | Review & Update | Manage Permissions | Deploy |
|---|---|---|---|---|---|---|
| Employee Expenses | Employee Expense Reports | Financial Payables Suite | Payables | ✓ | | |
| Integration Repository | Integration Repository | Applications Technology | Application Object Library | ✓ | | |
| Payables Invoices | Accounts Payables Invoices | Financial Payables Suite | Payables | ✓ | | |
| PO Requisitions | Purchase Requisitions | Procurement | Purchasing | ✓ | | |
| Profile Options | Profile Options | Applications Technology | Application Object Library | ✓ | | |
| Purchase Orders | Purchase Orders | Procurement | Purchasing | ✓ | | |
| User | User | Applications Technology | Application Object Library | ✓ | | |

Search and Select Entity

[ Cancel ] [ Submit ]

Product [                   ▼ ]
Entity Name [ ap_expense% ]
Description [         ]
                [ Search ]

Results

Previous [ 1-10 of 12 ▼ ] Next

Select All | Select None

| Select | Entity name | Description | Product | Type | Related entities |
|---|---|---|---|---|---|
| ☐ | AP_EXPENSE_FEED_DISTS_ALL | Accounting information for credit card transactions | Payables | TABLE | 🔍 |
| ☑ | AP_EXPENSE_FEED_LINES_ALL | Detailed information about credit card transactions imported from the credit card issuer | Payables | TABLE | 🔍    801 |
| ☐ | AP_EXPENSE_PARAMS_ALL | This table stores the Internet Expenses parameters for organizations. | Payables | TABLE | 🔍 |
| ☐ | AP_EXPENSE_REPORTS_ALL | Descriptive information about expense report templates | Payables | TABLE | 🔍 |

Related Entities

[ Back ] [ Cancel ] [ Submit ]

Entities related to : AP_EXPENSE_FEED_LINES_ALL

Select All | Select None

| Select | Entity name | Description | Product | Reference type |
|---|---|---|---|---|
| ☐ | FND_CURRENCIES | Currencies enabled for use at your site | FND | Referring |
| ☐ | AP_CARD_PROGRAMS_ALL | Information about credit card programs you have defined | SQLAP | Referring |
| ☐ | AP_CARDS_ALL | Information about credit cards issued to employees | SQLAP | Referring |
| ☐ | AP_CARD_CODES_ALL | Information for credit card codes that you define | SQLAP | Referring |
| ☐ | AP_EXPENSE_FEED_DISTS_ALL | Accounting information for credit card transactions | SQLAP | Referred |

[ Back ] [ Cancel ] [ Submit ]

FIG. 13

Searchable Attributes

| Details Display name | Attribute Name | Type | Description | Searchable | Displayed | Title | Stored | Secured |
|---|---|---|---|---|---|---|---|---|
| Show PoHeaderId | PO_HEADER_ID | NUMBER | Document header unique identifier | | | | | ✓ |
| Show TypeLookupCode | TYPE_LOOKUP_CODE | VARCHAR2 | Type of the document. (Combined with segment1 and org_id to form unique key; References PO_DOCUMENT_TYPES_ALL_B.document_subtype) | ✓ | ✓ | | | ✓ |
| Show PONumber | SEGMENT1 | VARCHAR2 | Document number - Combined with type_lookup_code and org_id to form unique key | ✓ | ✓ | ✓ | ✓ | |
| Show StatusLookupCode | STATUS_LOOKUP_CODE | VARCHAR2 | Status of the RFQ or Quotation (References PO_LOOKUP_CODES.lookup_code with LOOKUP_TYPE=RFQ/QUOTE STATUS) | ✓ | ✓ | | | ✓ |
| Show CurrencyCode | CURRENCY_CODE | VARCHAR2 | Unique identifier for the currency (References FND_CURRENCIES.currency_code) | ✓ | ✓ | | | ✓ |
| Show AmountLimit | AMOUNT_LIMIT | NUMBER | Blanket, Planned PO or Contract only: Maximum amount that can be released | ✓ | ✓ | | | ✓ |
| Show OrgId | ORG_ID | NUMBER | Operating unit unique identifier | | | | | ✓ |
| Show VendorId | VENDOR_ID | NUMBER | Supplier unique identifier | | | | | ✓ |

1300 — Add Custom Attribute 1301  1302  1303  1304         1310

FIG. 14

Expert Mode   Switch to Normal Mode

Select Query Group: Primary    [Populate Attributes]   [Modify Attributes]

SQL Statement                                                                1400

```
select a.profile_option_id, a.application_id, a.profile_option_name, a.hierarchy_type,
    b.language, b.user_profile_option_name, c.application_name,
    decode(d.level_id, 10001, 'Site', 10002, 'Application', 10003, 'Responsibility', 10004, 'User',
10005, 'Server', 10006, 'Org', decode(d.level_value, -1, 'Server', decode(d.level_value2, -
1, 'Responsibility', 'Server+Responsibility')), 'Unknown') at_level,
    ( case when d.level_id = 10001 then '_'
          when d.level_id = 10002 then
               (select x.application_name from fnd_application_tl x
```

Driving Table: fnd_profile_options a

Searchable Attributes

| Details Display name | Attribute Name | Type | Description | Searchable | Displayed | Title | Stored | Secured |
|---|---|---|---|---|---|---|---|---|
| Show ProfileOptionId | PROFILE_OPTION_ID | NUMBER | PROFILE_OPTION_ID | | | | | ✓ |
| Show ApplicationId | APPLICATION_ID | NUMBER | APPLICATION_ID | | | | | ✓ |
| Show ProfileOptionName | PROFILE_OPTION_NAME | VARCHAR2 | PROFILE_OPTION_NAME | ✓ | | | | ✓ |

SYSTEM AND METHOD FOR SEARCHING ENTERPRISE APPLICATION DATA

COPYRIGHT NOTICE

A portion of the disclosure of this patent document contains materials which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This application is related to co-pending applications entitled "Searchable Object Network," Ser. No. 12/210,420, filed Sep. 15, 2008 and "System and Method for Semantic Search in an Enterprise Application," Ser. No. 12/212,178, filed Sep. 17, 2008 the disclosure of each of which is incorporated by reference in its entirety for all purposes.

BACKGROUND OF THE INVENTION

The present invention relates to enterprise systems, and more particularly to techniques for identifying and searching searchable data associated with applications in an enterprise system.

Many businesses and other organizations use software applications and/or suites of such applications to organize their business affairs, track business performance, manage employee data and perform similar functions. These enterprise applications are often quite complex, relying on numerous database tables to store and manage data for virtually every aspect of an organization's business. Exemplary enterprise applications can include supply chain management ("SCM") applications that manage raw materials, work-in-process and/or finished products, and coordinate with suppliers; customer relations management ("CRM") applications that are used to track, store and/or manage customer information; financial applications that track and/or analyze the financial performance of the organization; human resources applications that provide management of the human resources functions of the organization, and other applications. In some cases, these applications are standalone applications; in other cases, a single business application or suite of applications might provide some or all such functionality. Specific, non-limiting examples of enterprise applications include JD Edwards Enterpriseone, PeopleSoft Enterprise applications (including, for example, PeopleSoft Enterprise Student Administration), and the Oracle eBusiness Suite, all available from Oracle Corporation.

Enterprise applications typically store and process business data in one or more data stores. In one configuration, the data is stored in one or more tables of a database managed by a relational database management system ("RDBMS") and maintained by the business application. Each enterprise application may use a separate data store, which may be an independent database or portion of a database. Thus, for example, where a business system includes a CRM application and an enterprise resource planning ("ERP") application, the CRM application may use a data store separate from the ERP application. Each application typically maintains and manages the data stored in its data store.

A relational database typically is designed to reduce or minimize redundancy in stored data by structuring the database tables to store data in a normalized form. This can result in a single business object being stored across multiple database tables. Structured queries may be used to extract data from the relevant tables for processing and/or presentation to an end user of the business system. However, data stored in relational databases typically may not be stored or directly accessible in a format conducive to text searching, presentation to end users, or other context-related manipulation.

BRIEF SUMMARY OF THE INVENTION

Embodiments of the present invention provide techniques for identifying, searching, and extracting searchable information from and within an enterprise system. A search modeling tool is provided that can communicate with multiple enterprise applications to create object definitions describing searchable data stored in each application. The object definitions may be used to extract searchable data from the applications, thus allowing for manipulation of the data in formats usable in text searching, user presentation, and other applications. The search modeler may interface with each application using common protocols, allowing for generalization of object definitions and subsequent crawling across a variety of enterprise applications.

In an embodiment, a method for providing searchable data within a system may include generating a searchable data definition for a first application in the system, establishing a first connection to the first application, receiving information identifying searchable data associated with the first application, adding metadata describing the searchable data to the first searchable data definition, and storing the first searchable data definition. The searchable data definition may enable extraction of searchable data from the first application.

In an embodiment, a method for providing searchable data within an enterprise system may also include establishing a second connection to a second application in the system, receiving information identifying searchable data associated with the second application, adding metadata describing the searchable data associated with the second application to a second searchable data definition, and storing the second searchable data definition in the second application. The second searchable data definition may enable extraction of searchable data from the second application.

In an embodiment, a method for indexing searchable data stored in a system having multiple enterprise applications may include communicating with the applications to identify searchable data stored in each application using common protocols, creating searchable data definitions for a plurality of objects stored in the applications, the searchable data definitions containing metadata describing the location of searchable data in the applications, and indexing the searchable data stored in the applications using the searchable data definitions.

In an embodiment, a system for extracting searchable data may include a plurality of enterprise applications, each enterprise application having a relational data store storing searchable data and non-searchable data, a plurality of communication points associated with the applications and configured to provide a standardized interface to the internal structure of data stored in the data store of the associated application, a search modeler configured to create searchable data definitions that identify searchable data in each data store, and a search crawler to extract searchable data using the searchable data definitions.

BRIEF DESCRIPTION OF THE DRAWINGS

FIG. 7 shows an example of a user interface for viewing and manipulating searchable objects in an enterprise application system according to an embodiment of the present invention.

FIG. 8A shows an example of a user interface for viewing a searchable object using a search modeler according to an embodiment of the present invention.

FIG. 8B shows an exemplary interface resulting from a selection of the a related entities item in the interface shown in FIG. 8A.

FIG. 13 shows an example user interface for manipulating and defining attributes for logical model entities according to an embodiment of the invention.

FIG. 14 shows an example user interface for defining an attribute according to an embodiment of the invention.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide a search modeling tool that can communicate with multiple enterprise applications to create data definitions describing where searchable data is stored in each application, and make these data definitions available to other search-related applications such as one or more search crawlers. Typically, a search crawler systematically accesses searchable data within one or more applications to prepare the searchable data for use in generating responses to search queries typically submitted by a human operator. The data may be rated, categorized, or indexed by the crawler or another search application to enable efficient searching. Searchable data may be primarily plain text, though it may include other data that can be accessed and processed by a search crawler or be matched to search parameters specified by a human operator.

In an embodiment, data definitions may be used to extract searchable data from the applications, thus allowing for manipulation of the data in formats usable for text searching, user presentation, and other applications. The search modeler may interface with each application using communication points configured to use common protocols, allowing for generalization of data definitions and subsequent crawling across a variety of enterprise applications.

Figure 1:
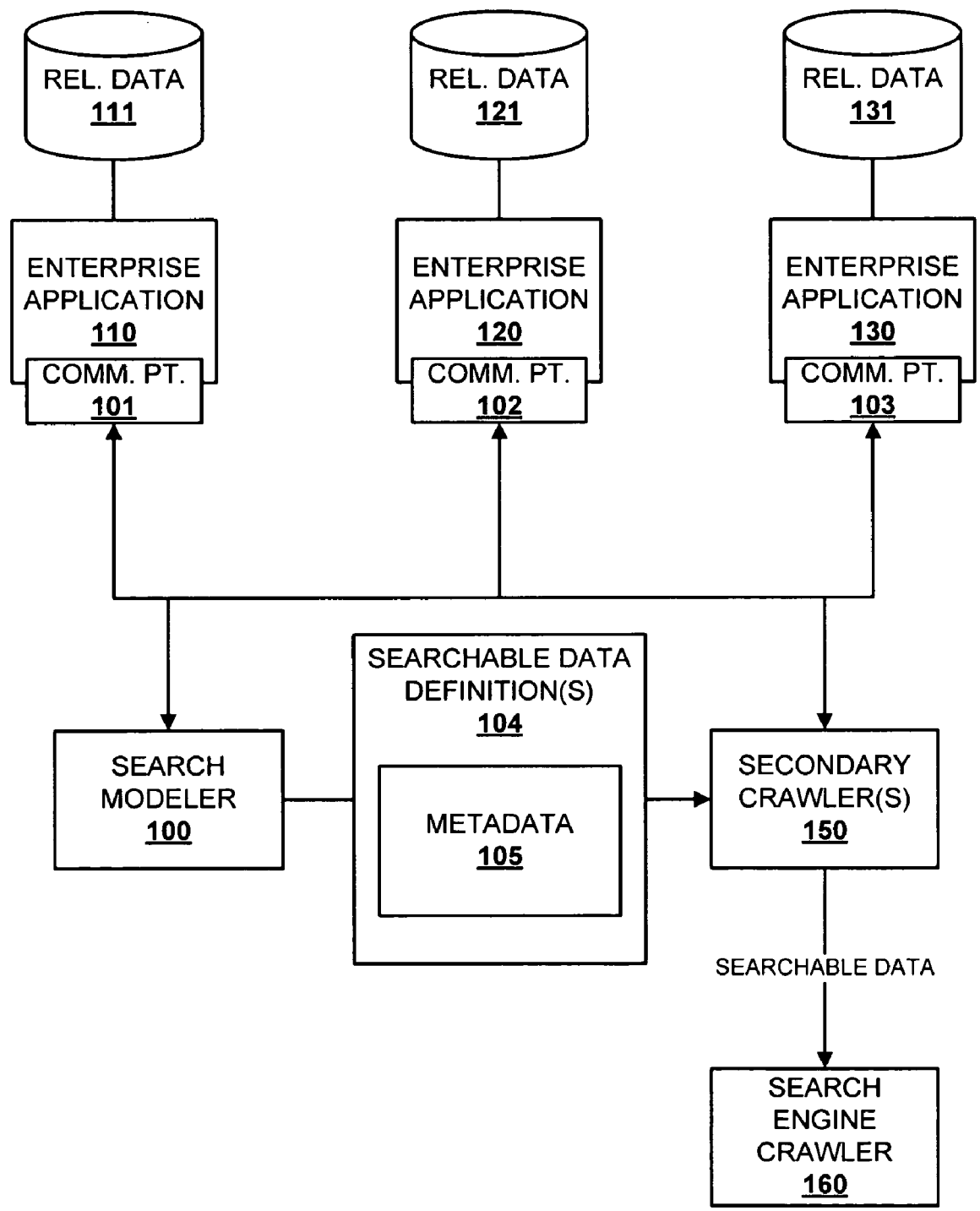
FIG. 1 shows a simplified block diagram of a system having a search modeler according to an embodiment of the present invention.

FIG. 1 shows a simplified block diagram of a system having a search modeler 100 according to an embodiment of the present invention. The search modeler 100 communicates with enterprise applications 110, 120, 130 via communications points 101, 102, 103, respectively. Each enterprise application may include a data store 111, 121, 131, respectively, that stores business objects and data used by, generated by, or otherwise associated with the application.

As previously described, the data stores may be implemented as one or more tables of a database managed by a relational database management system ("RDBMS") and maintained by the enterprise application. Each application typically maintains and manages the data stored in its data store. A relational database typically is designed to reduce or minimize redundancy in stored data by structuring the database tables to store data in a normalized form. This can result in a single business object within an application being stored across multiple database tables. As a specific example, a specific invoice business object may be partly stored in each of a "customer" table and an "orders" table. Thus, data stored in relational databases typically may not be stored or directly accessible in a format conducive to text searching, presentation to end users, or other context-related manipulation. For example, information that a human operator may consider a single data item or a set of related data items may be distributed across multiple tables, preventing the user from directly searching or accessing the data.

As a specific, non-limiting example, a customer purchase and payment information application could store data in five tables: a table to store a list of all purchases, a table to store customer information, a table to list all payments, and two tables to connect the customer to each of his purchases and each of his payments. Thus, a direct text search of the application's data tables would not show the relationship between the customer's payment history and his outstanding orders, even though this information is contained in searchable data within the application. For example, a user of the application would not be able to directly search for or identify customers with outstanding orders that had missed a prior payment. In conventional enterprise systems, searchable information may be retrieved by directly querying the data stores, such as where structured query language (SQL) commands are used to directly access a database. However, users often do not have direct access to the database, and enterprise applications provide only specific data access based on pre-configured SQL commands. In contrast, embodiments of the present invention allow for user-submitted searches using, for example, keyword lists, natural-language phrases, Boolean searches, and similar search techniques, without requiring users to have the ability to execute arbitrary database commands.

To allow for searching, the search modeler 100 may provide information describing the location of searchable data within the enterprise applications. For example, the search modeler may indicate database tables or other objects in the data store 111, 121, 131 that store searchable data, and provide a description of each object's structure and relation to other objects in the data stores 111, 121, 131. The search modeler 100 may create searchable data definitions 104 that provide information about the searchable data in each application accessible to the search modeler 100. The searchable data definitions 104 for an application typically include metadata 105 that describes searchable data contained in the relevant enterprise application's data store. For example, a searchable data definition may be a collection of metadata statements or properties that describe searchable data stored in a specific enterprise application 110, 120, 130. In some embodiments, multiple searchable data definitions may be created for each application. The one or more or more searchable data definitions for an application may be referred to herein as a searchable data model for the application. A searchable data definition also may reference one or more other searchable data definitions, thus allowing multiple applications to be included in a single searchable data model.

Searchable data definitions created by the search modeler may not themselves include or directly provide the searchable data available in the applications. The searchable data definitions identify the searchable data and the location of the searchable data. Therefore, a first crawler, such as a secondary crawler 150, may read the data definitions to identify where searchable data is stored in each application. As previously described, a data crawler may systematically access and process the searchable data to organize the data for searching. Since a data definition identifies what data within a data store is searchable and where the searchable data is stored, the crawler 150 may crawl application data identified in the searchable data definitions to locate and extract searchable data from the applications. This searchable data may then be further processed, such as by a search engine crawler 160. The search engine crawler may be, for example, an indexing crawler associated with a search engine or a search service in the enterprise system containing the applications. In some embodiments, one or more secondary crawlers 150 may operate at the direction of, or in response to a request or command from, the search engine crawler 160. Searchable data extracted by the data crawler 150 may be indexed and formatted by the indexing crawler for searching by or presentation to an end user, such as by a search engine or other user interface (not shown). In this manner, data associated within the enterprise applications may be searched, viewed, and manipulated by an end user that is not otherwise able to search the data directly from the relational data stores.

In some configurations, one or more secondary crawlers 150 may be implemented within a corresponding enterprise application. For example, each enterprise application 110, 120, 130 may implement an associated crawler 150. Such a crawler may be referred to as an application crawler. An application crawler may respond to requests or instructions from a search engine crawler 160, such as where a search engine crawler 160 constructs a query specific to an application that is then executed by the appropriate application crawler.

In an embodiment, a search modeler may allow a user to create a searchable data definition without storing or duplicating data stored in the application or applications for which the searchable data definition is created. For example, the search modeler 100 may connect to one or more enterprise applications 110, 120, 130 and receive information about searchable data stored in the applications. The search modeler may present this information to a user and allow the user to create a searchable data definition. As described herein, the search modeler may automate some or all of the creation of the searchable data definition. Since the search modeler uses information about searchable data provided by the enterprise applications, it does not need to retrieve or store the searchable data itself when creating the searchable data definition. Thus, the search modeler allows for efficient creation of searchable data definitions using relatively little communication bandwidth between the search modeler and the applications, with relatively low storage requirements.

In an embodiment, the search modeler may provide information regarding live data. As used herein, "live" data refers to data associated with in-use enterprise applications. In conventional systems, it is undesirable for users to interact with or access live data due to concerns over data corruption or adverse performance effects on the live system. However, since the search modeler can communicate with an enterprise application using its communication point and does not require direct access to the enterprise application data, searchable data definitions may be created based on live data while avoiding the undesirable effects usually associated with operating on live or production systems. For example, it may be undesirable to submit an SQL query to a live database, since the query could adversely affect operation of an application using the database. However, in an embodiment of the present invention the search modeler's access via a communication point is integrated with the enterprise application's database access and management operations. In this manner, undesirable side effects of operating on live data using the search modeler may be reduced or avoided.

Figure 2A:
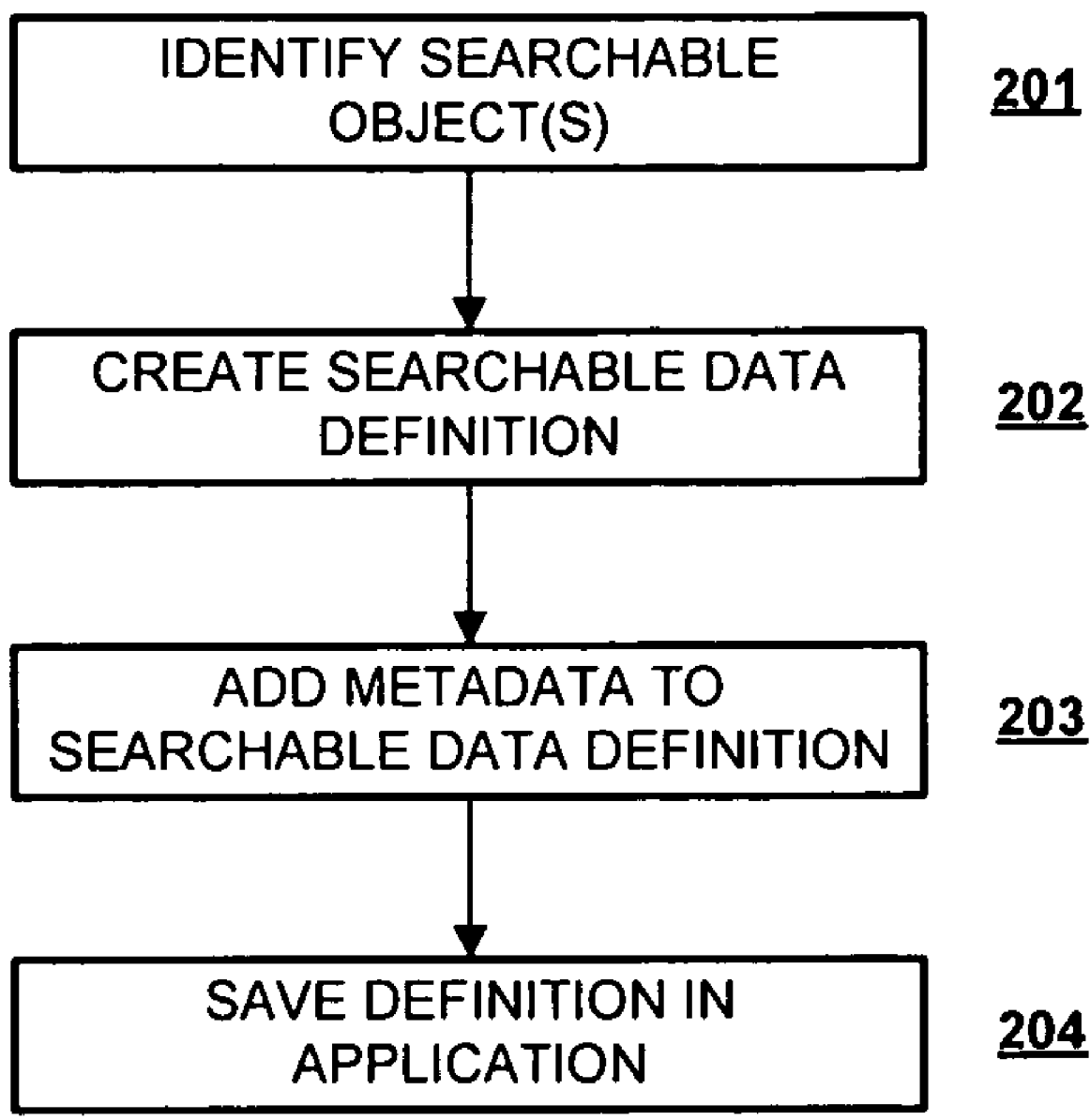
FIG. 2A shows a simplified example of a process for creating a searchable data definition according to an embodiment of the present invention.

FIG. 2A shows a simplified example of a process for creating a searchable data definition according to an embodiment of the present invention. Portions of the process depicted in FIG. 2 may be implements in hardware, software (e.g., code, instructions, and computer programs), executed by a processor, or combinations thereof. In an embodiment, portions of the processing may be performed by the search modeler 100 depicted in FIG. 1.

At 201, a user may select or identify a new searchable data definition to be created. A user may identify a specific database object for which the new searchable data definition is to be created, or the user may issue a command to the search modeler to create a new searchable object definition for a specific application. A new searchable data definition may be created by the search modeler (step 202). The new searchable data definition may initially be empty, or it may contain a template or other pre-defined set of data. Metadata describing searchable data, such as the location and structure of the searchable data in an application, and methods of accessing the searchable data, may be added to the searchable data definition (step 203). The searchable data definition may then be saved in the enterprise system, such as in the application with which the definition is associated (step 204).

Figure 2B:
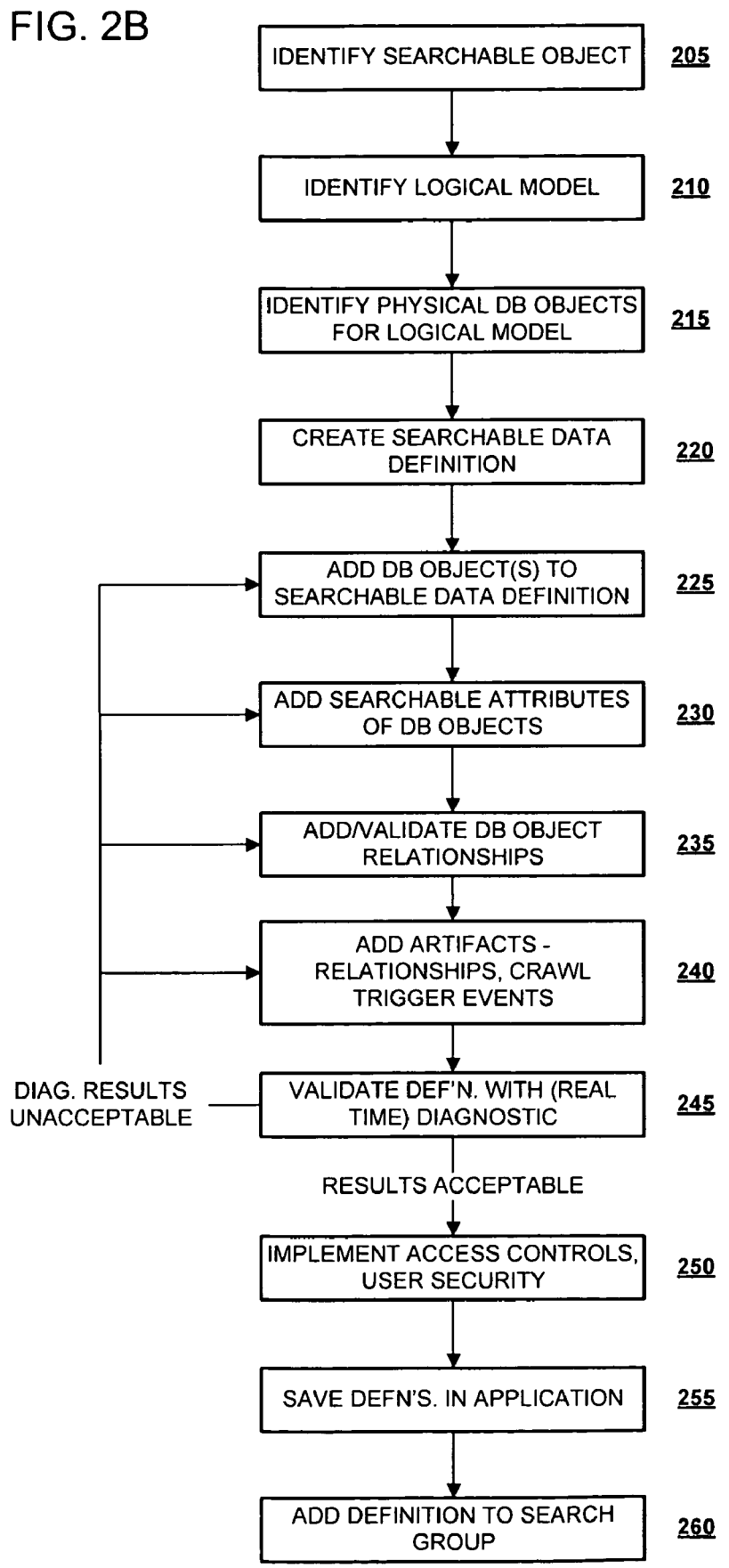
FIG. 2B shows a simplified example of a process for creating a searchable data definition according to an embodiment of the present invention.

FIG. 2B shows another simplified example of a process for creating a searchable data definition according to an embodiment of the present invention. Portions of the process depicted in FIG. 2 may be implemented in hardware, software (e.g., code, instructions, and computer programs) executed by a processor, or combinations thereof. In an embodiment, portions of the processing may be performed by the search modeler 100 depicted in FIG. 1.

At 205, a user may identify a searchable data definition to be created. As a specific, non-limiting example, a user may decide to create a searchable data definition for purchase orders stored in a purchasing application. The user may then identify a logical model corresponding to the desired searchable data definition (step 210). In some cases, the logical model may be identified or selected first, and one or more relevant searchable data definitions identified for the desired logical model. The user may identify physical database objects such as tables or portions of tables corresponding to elements of the logical model (step 215). As used herein, a physical object in a data store, such as a database table, data object, or other entity, that contains searchable data may be referred to as a searchable object.

In some embodiments, the process of identifying physical database objects may be partially or completely automated by the search modeler. In other embodiments, a user may also direct the search modeler to select the appropriate objects. A new searchable data definition may be created by the search modeler (step 220). The new searchable data definition may initially be empty, or it may contain a template or other pre-defined set of data. The new searchable data definition may be created before the searchable object, logical model, or physical objects are identified, or at any point before, during, or after these operations (steps 205-215). For example, a user may direct the search modeler to create an "empty" searchable object definition, and then later identify the searchable object, logical model, or physical objects.

Searchable data definitions may include a list of the physical database objects corresponding to the logical model. For example, a user may add an identification of one or more database objects containing searchable data to the searchable data definition (step 225). The searchable attributes of relevant database objects also may be added to the searchable data definitions (step 230). For example, relevant database columns for specific searchable data can be identified in the definitions. Additional relationships may be incorporated into the data definition, such as other relationships used to formulate valid SQL queries during subsequent crawling operations (step 235). For example, where two database tables are linked via a foreign key, that relationship may be included in the searchable object definition to make sure that appropriate relationships among the searchable data are preserved when the data is crawled for searching.

In some cases, searchable data definitions include additional "artifacts" used to further define or describe searchable data. For example, there may be other links between database tables, columns, objects, or other items in an enterprise application that are not necessary to access searchable data in the application, but can provide additional functionality in the searchable data such as scheduling or managing crawling events, or showing relationships between objects. As a specific example, a searchable data definition may include an indication of how often a database table is updated, which can be used to schedule crawls that timely capture changes made to data stored in the table. These artifacts may be added to the searchable data definitions (step 240).

One or more diagnostic searches or other verification procedures may then be performed to validate the searchable data definition (step 245). Typically, a diagnostic search enables a user to evaluate how searchable data described in a searchable data definition will be used at a later point in time, such as when accessed by an end user of an enterprise system. The diagnostic search may not include a complete or partial search of real data, such as where it merely verifies the validity of metadata included in a searchable data definition, or verifies user access elements of the searchable data definition. In an embodiment, the diagnostic search may run a partial or complete search using real or test data, where at least a portion of the search results are masked or otherwise not presented to a user of the search modeler based on various user access controls. For example, a search involving employee salaries or other confidential or sensitive information may mask the search results within the search modeler to prevent unintended disclosure of the information. A diagnostic verification also may verify that relationships identified or defined in the searchable data definition are consistent within the definition and with relationships stored in the application.

A diagnostic verification in 245 may be performed in real time, i.e., with a minimum or negligible delay in extracting and processing search results after the search is initiated, and using stored data that is not out of date. A diagnostic search may use "live" data from one or more enterprise applications. During a live diagnostic search, the search modeler crawls data identified by a searchable data definition and extracts searchable data from the relevant database objects using real data stored in the enterprise applications. The crawl and data extraction may be performed while the enterprise applications are in use, and results may be presented to a user with little or no delay. By providing the ability to run diagnostic searches, a search modeler provides an indication of results that can be expected when using the searchable data definition to search real, up-to-date data. Diagnostic searches also may be run against test or exemplary data, such as where a user wishes to test specific search or data conditions under more controlled conditions. If the results of the diagnostic search or other verification are unacceptable, a user may repeat some or all of the previous configuration (steps 225-240). For example, a diagnostic search may provide evidence that a database object relationship was incorrectly identified in a searchable data definition, leading to inaccurate search results. As a specific example, a user may change relationships previously defined in step 235 or add new search relationships using the same underlying search mode. Some or all of the configuration also may be repeated to refine a searchable data definition for other reasons, such as where a user wishes to add or remove searchable data from a searchable data definition. Other changes may be made to the searchable data definition.

User access and security controls may be added to the searchable data definition (step 250), such as where database objects identified in the searchable data definition present different data to different users or categories of users. Thus, search results and capabilities resulting from use of the searchable data definition can be integrated with pre-existing user access controls and security mechanisms. In this configuration, the searchable data definition may include functionality to restrict the data selected from the searchable data or presented to a user performing a search.

Once searchable data has been defined, a searchable data definition is saved (step 255), such as in the appropriate enterprise application. Searchable data also may be organized into search groups or other structures (step 260). These groups may be used, for example, to further designate users or user roles that can access certain searchable data or specific search functionality. The searchable data definition may be defined partly or entirely using a standardized structure or data format. For example, it may be described in an XML format. As described below with reference to Table I, a single database table or other physical element may store or correspond to multiple items in a logical model, and a single item in a logical model may be related to multiple physical objects.

As a specific, non-limiting example, a user might define the logical entity "Purchase Order" (PO) corresponding to a purchase order business object. The logical model for this object could include items such as the purchase object header, line information, and shipment information as shown in Table I.

TABLE I

| Example Logical Object Model | Example Physical Elements |
| --- | --- |
| Purchase Order (PO) | |
| PO Header | PO_HEADERS_ALL |
| PO date | PO_HEADERS_ALL |
| Type | PO_HEADERS_ALL |
| Amount | PO_HEADERS_ALL |
| Currency | PO_HEADERS_ALL |
| Vendor | PO_VENDORS |
| Locaction | PO_VENDOR_SITES_ALL |
| PO Line Information | PO_LINES_ALL |
| Item Code | MTL_SYSTEM_ITEMS |
| Category Code | MTL_ITEM_CATEGORIES |
| Description | PO_LINES_ALL |
| Quantity | PO_LINES_ALL |
| Unit | PO_LINES_ALL |
| PO Shipment Information | RCV_SHIPMENT_HEADERS |
| Shipment Code | RCV_SHIPMENT_LINES |
| Quantity Rec'd. | RCV_SHIPMENT_HEADERS |
| Location | RCV_SHIPMENT_SITE |

As shown in the example, logical models may be hierarchical—the sample logical model in Table I includes attributes such as the date, type, amount, and currency of the purchase order, and the vendor and vendor location associated with the purchase order as sub-entities of the top-level entity "PO Header." Logical entities in the logical model need not have sub-entities. The logical model can be used within a search modeler to generate an appropriate searchable data definition, which also may be hierarchical. Within the search modeler, the user may identify physical elements within the appropriate database table or tables that correspond to the logical entities. For example, the table PO_HEADERS_ALL may include searchable data corresponding to the purchase object date, type, amount, and currency, and the tables PO_VENDORS and PO_VENDOR_SITES_ALL may include searchable data identifying the vendors and vendor locations associated with the purchase orders. As previously described, the database tables may be linked logically, such as by use of a foreign key or other structure. A user may specifically include the link in a searchable data definition, or it may be included by the search modeler automatically.

The hierarchy of a logical model may include a master group, such as "PO Header" in the example, that is associated with one or more child groups, such as "PO Line Information" and "PO Shipment Information." In general, a single record in a master group may correspond to one or more stored records associated with a child group. As a specific example, a specific purchase order may be associated with one or more line items, shipments, or both. The purchase order may be a record in the master group "PO Header," and each of the line items or shipments may be a record in the appropriate child group. Such a structure may model a master-child relationship, such as a one-to-many relationship, in a database that has tables corresponding to the logical model. Relationships among groups may be included in a searchable data definition, and the group information preserved when searchable data is crawled and indexed. An example of a search modeler interface for manipulating groups is described below.

A user may include additional artifacts to further define the scope and use of searchable data described by the searchable data definition. These artifacts also may be automatically identified and included in a searchable data definition by the search modeler. For example, the enterprise application in which the purchase orders are used might receive updated shipment information, including shipment codes, at regular, known intervals. In this case, the user can include metadata defining or identifying the frequency at which searchable data identified in a searchable data definition may change. Metadata also may be included automatically by the search modeler. A crawl scheduler or other scheduling system may determine when or how often to crawl the searchable data based on the metadata provided by the user. Information regarding when or how often to crawl searchable data also may be provided automatically by the search modeler.

A search modeler as described herein may define and communicate with enterprise applications using one or more standardized protocols that are consistent across multiple applications. For example, the search modeler may define specific message exchanges used by the search modeler to discover and describe searchable data within the applications. As one example, the search modeler may define a "List Searchable Objects" request. A conforming application would reply to the request by sending a message listing details of all objects within the application that contain searchable data, or listing objects within the application that contain a subset of data meeting requirements specified by a user or automatically generated by the search modeler. As another example, the search modeler may define a "Get Object Definition" request. A conforming application responds to such a request by sending an XML or other definition of a specific object identified by the search modeler or the application. As another example, the search modeler may define a "Save Object Definition" request. An application receiving such a request may save the object specified by the search modeler or send a response indicating whether the specified object can be saved.

An exemplary request sent to an application from a search modeler using specific XML messages may be:

```
<?xml version="1.0" encoding="UTF-8"?>
 <orcl:requestMessage
 xmlns='http://www.oracle.com/apps/fnd/search/modeler'
   xmlns:orcl='http://www.oracle.com/apps/fnd/search/modeler'
   xmlns:xsi='http://www.w3.org/2001/XMLSchema-instance'
xsi:schemaLocation='http://www.oracle.com/apps/fnd/search/modeler/
RequestProtocol.xsd'>
     <orcl:messageHeader>
        <orcl:messageId>12345</orcl:messageId>
        <orcl:messageType>authenticationRequest
        </orcl:messageType>
     </orcl:messageHeader>
     <orcl:messageBody>
        <req:payload
xmlns='http://www.oracle.com/apps/fnd/search/modeler/AuthRequest'
xmlns:req='http://www.oracle.com/apps/fnd/search/modeler/
AuthRequest'>
          <req:element
name="user"><![CDATA[sesmodeler]]></req:element>
          <req:element
name="password"><![CDATA[xxxxxxx]]></req:element>
       </req:payload>
     </orcl:messageBody>
 </orcl:requestMessage>
```

This request attempts to authenticate a user with the application. An exemplary response that may be returned by the application is:

```
<?xml version="1.0" encoding="UTF-8"?>
<orcl:responseMessage
xmlns='http://www.oracle.com/apps/fnd/search/modeler'
   xmlns:orcl='http://www.oracle.com/apps/fnd/search/modeler'
   xmlns:xsi='http://www.w3.org/2001/XMLSchema-instance'
xsi:schemaLocation='http://www.oracle.com/apps/fnd/search/modeler/
```

-continued

```
responseprotocol.xsd'>
    <orcl:messageHeader>
        <orcl:messageId>12345</orcl:messageId>
        <orcl:messageType>authenticationResponse
        </orcl:messageType>
        <orcl:responseStatus>error</orcl:responseStatus>
    </orcl:messageHeader>
    <orcl:messageBody>
        <res:payload
xmlns='http://www.oracle.com/apps/fnd/search/modeler/AuthResponse'
xmlns:res='http://www.oracle.com/apps/fnd/search/modeler/
AuthResponse'>
            <!-- No Payload -->
        </res:payload>
    </orcl:messageBody>
    <orcl:fault>
        <orcl:faultCode><![CDATA[APP-FND-4001]]>
        </orcl:faultCode>
        <orcl:faultReason><![CDATA[User is not authorized to access
this feature ]]></orcl:faultReason>
            <orcl:faultStack><![CDATA[
            .....]]>
            </orcl:faultStack>
    </orcl:fault>
</orcl:responseMessage>
```

In this example, the request describes a user that is not authorized to access the requested function. Other message exchanges and data structures may be used. Other functionality also may be defined in the protocols used by the search modeler, such as where an XML defines messages or fields similar to those used in the examples above. The search modeler or the enterprise system in which the search modeler operates may suggest or require that applications conform to the standard interface defined by the search modeler, such as by implementing a communication point as described with reference to FIG. 1.

Figure 3:
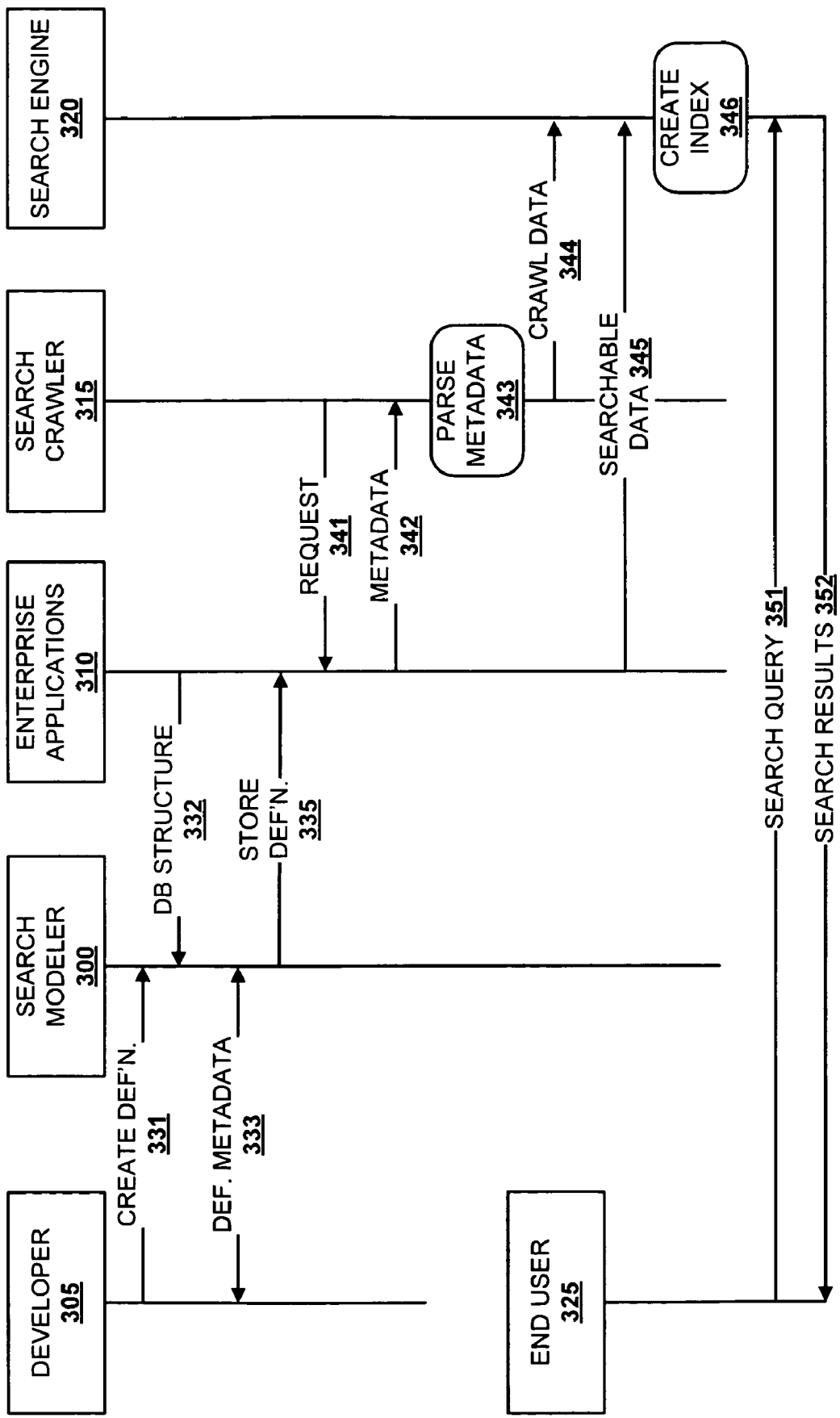
FIG. 3, shows a simplified example of communication flow in a system using a search modeler and searchable data definitions according to an embodiment of the present invention.

FIG. 3 shows a simplified example of communication flow in a system using a search modeler and searchable data definitions according to an embodiment of the present invention. As previously described, a user 305 may use a search modeler 300 to create a searchable data definition (step 331), that includes metadata describing searchable data stored in an enterprise application. Typically, the search modeler 300 is a software application run or accessed by a user 305. The search modeler may execute on a remote computer in communication with the enterprise system, such as the user's local computer, or it may be executed within the enterprise system. The enterprise system may include one or more applications 310 as previously described with respect to FIG. 1.

To define storage parameters of searchable data, a database structure may be retrieved (step 332) from the applications 310 and incorporated into the searchable data definition. To retrieve the database structure and other information regarding searchable data in the application, a search modeler may communicate with applications 310 using communication points that implement one or more common protocols as previously described. For example, each application may implement a communication point that conforms to predefined protocols as previously described. A user also may define metadata describing or specifying the location of searchable data within the applications to be stored in the searchable data definition (step 333). As previously described, additional relationships, artifacts, and other metadata also may be added to the searchable data definitions. The searchable data definition then may be stored (step 335) in the application 310 for which it describes the location of searchable data.

Once created, a searchable data definition may then be used by applications such as search crawlers. A search crawler 315 can extract searchable data from the applications by generating one or more requests based on metadata in a searchable data definition, and sending the requests (step 341) to the appropriate application. For example, a search crawler may establish communication with an application using a communication point as previously described, and send a request to the application requesting a list of objects containing searchable data that are available in the application. The application may respond by providing metadata (step 342) to the requesting search crawler. The relevant metadata may be extracted by the application from a searchable data definition for searchable data in the application. The search crawler may then parse the metadata (step 343) received from the application to identify the location and means of accessing searchable data stored in the responding application 310. Crawl data may then be provided (step 344) to a search engine 320. The crawl data may define, for example, a query that the search engine should use to retrieve searchable data from the application, how often an entity having searchable data should be crawled, or other information. The crawl data also may include metadata used by the search engine to construct specific searches directed to the application.

Based on the crawl data, the search engine may extract searchable data (step 345) from the application and create an index of the extracted data (step 346). When an end user 325 initiates a search (step 351) in the enterprise system, the search engine may use the index of searchable data to generate search results (step 352) that include searchable information stored in one or more applications. In some configurations, search results may include a listing of which application provided various results, how the user can access the information in the application, or other information about the application-related search results. The search may be performed across multiple applications, and the search results may indicate that multiple applications are included in the search and which application or applications were searched.

Figure 4:
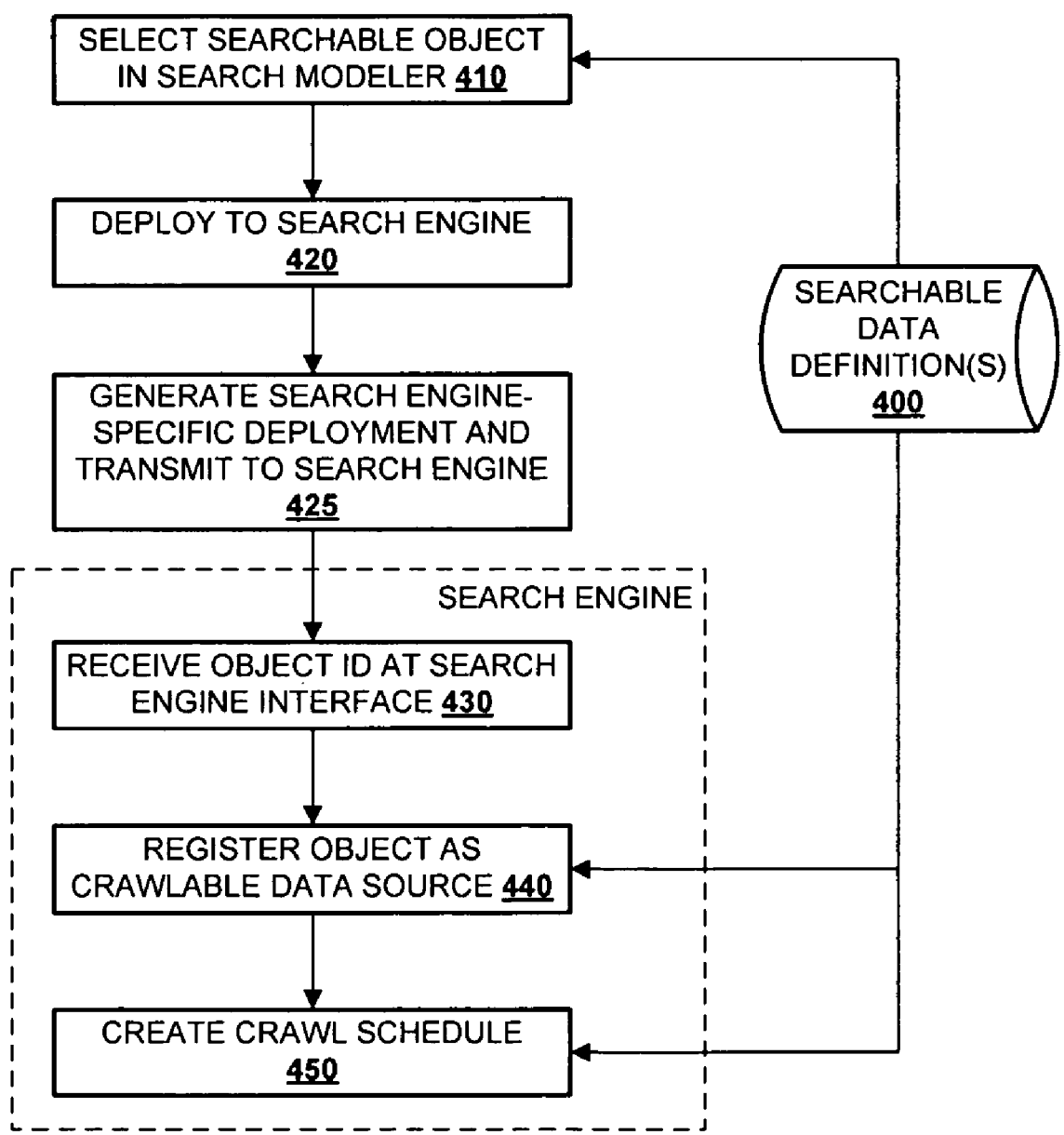
FIG. 4 shows an example of a simplified process for deploying searchable data definitions according to an embodiment of the present invention.
Figure 5:
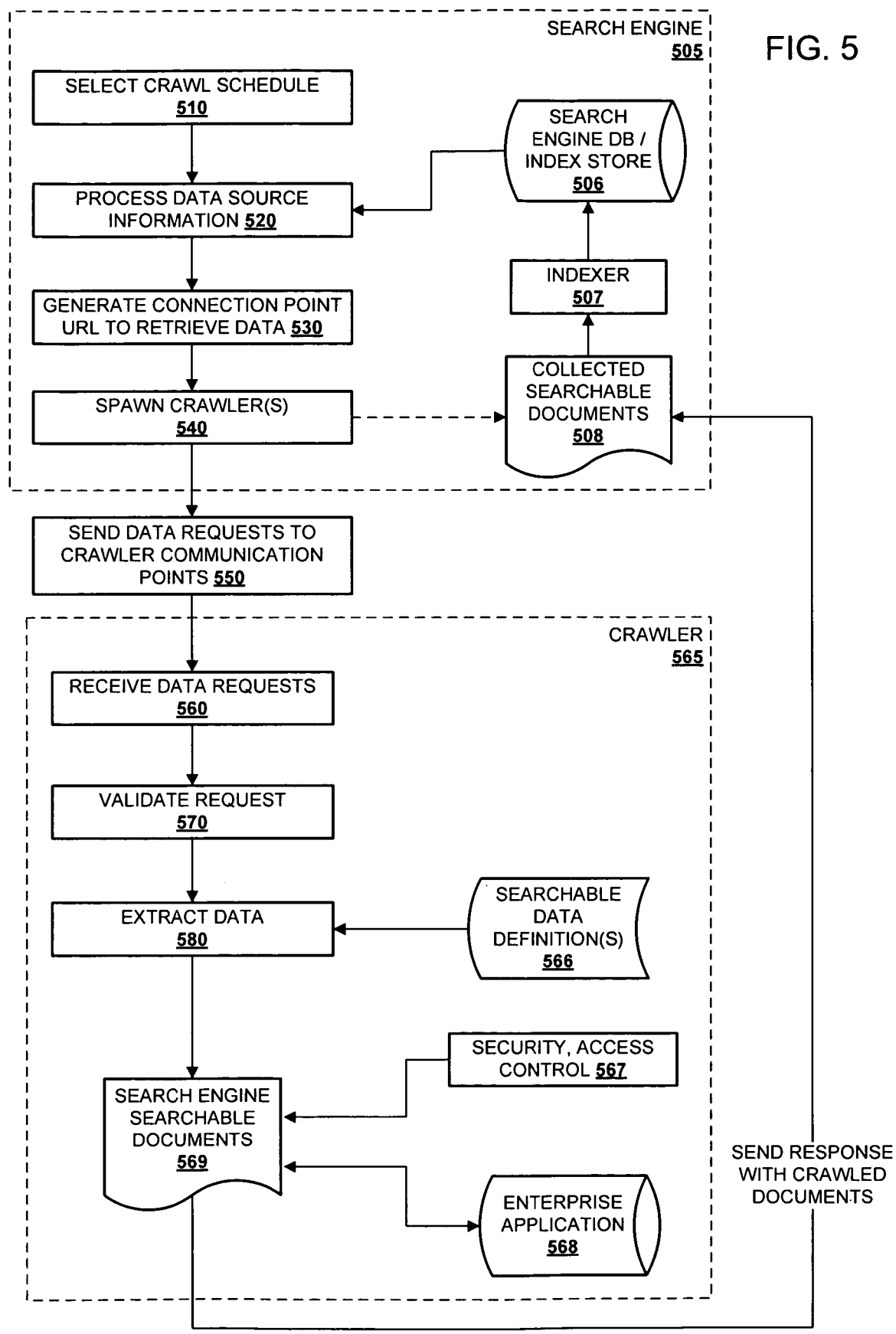
FIG. 5 shows an example of a simplified process for crawling searchable data in enterprise applications using searchable data definitions according to an embodiment of the present invention.
Figure 6:
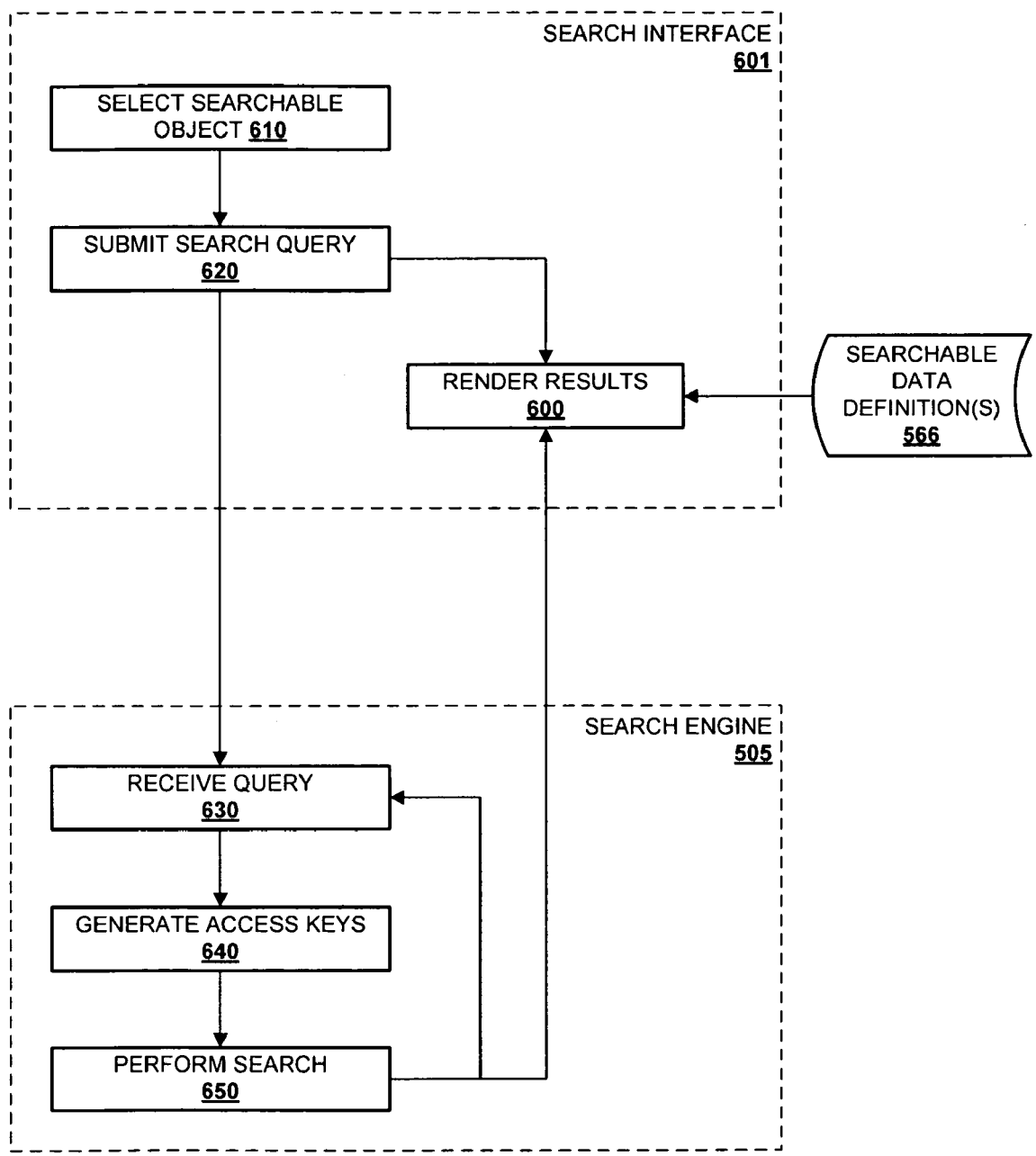
FIG. 6 shows an example of a simplified process for implementing a user search in a system using searchable data definitions according to an embodiment of the present invention.

Searchable data definitions may be incorporated into pre-existing enterprise systems. FIGS. 4-6 show simplified examples of processes for implementing, deploying, and using searchable data definitions. Additional configurations may be used with the methods and systems described herein to achieve integration with a variety of enterprise systems.

FIG. 4 shows an example of a simplified process for deploying searchable data definitions according to an embodiment of the present invention. A user may select an object containing searchable data using an interface such as a search modeler (step 410). One or more searchable data definitions 400 for the selected object may be defined as previously described, or the user may create a new searchable data definition for the selected object. The searchable data definition is then made available to the search engine (step 420). The search modeler may generate a deployment configuration for the specific search engine, or the object may be deployed in a standardized configuration (step 425). At the search engine, the object is received and registered as a crawlable data source, i.e., one containing searchable data (steps 430-440). After being registered as a data source, the searchable data defined by the searchable data definition can be included in crawl schedules used by the search engine to index searchable data in the enterprise system (step 450). Metadata in one or more searchable data definitions 400 may be used to select the searchable object (410), to properly register the searchable object as a data source (440), to generate a crawl schedule that is consistent with the data or data source described by the searchable data definition (450), or a combination thereof.

FIG. 5 shows an example of a simplified process for crawling searchable data in enterprise applications using searchable data definitions according to an embodiment of the present invention. In a search engine 505, a crawl schedule is selected for one or more applications, searchable objects, or other entities (step 510). The crawl schedule may be, for example, a schedule such as described with reference to FIG. 4. Data source information, such as the list of crawlable data sources described with reference to FIG. 4, is processed to identify sources from which to extract searchable data (step 520). A communication point reference, such as a URL, may be generated (step 530) that points to searchable data to be captured by one or more crawlers. The search engine may then spawn one or more indexing crawlers (step 540), i.e., processes to collect searchable text from the identified data source. Indexing crawlers may collect searchable data 508 by sending data requests to the appropriate communication point (step 550). The search engine's indexing crawlers may access the stored data directly, or they may send the data requests to one or more secondary crawlers as previously described with respect to FIG. 1.

When a crawler 565 receives a data request (step 560), the request may be validated to insure that it references appropriate stored data and is otherwise a proper request (step 570). Data extractors included in or generated by the crawler then use searchable data definitions 566 to extract searchable data from the identified applications (step 580), and store the searchable data in one or more documents 569 that are in an appropriate format for searching or indexing by the search engine. Where the enterprise system or the individual enterprise applications implement access controls 567, the same access controls may be applied to restrict the information extracted or included in the searchable documents. The searchable documents are then indexed by the search engine and stored in a database, index store, or other storage mechanism, typically within the associated enterprise application 568. Searchable documents 508 may be processed by an indexer 507 to organize, index, and otherwise prepare the documents for storage in, for example, a search engine index 506.

FIG. 6 shows an example of a simplified process for implementing a user search in a system using searchable data definitions according to an embodiment of the present invention. A search interface 601 may allow an end user to view and select searchable objects. After selecting one or more objects (step 610), the user submits a search query that is sent to the search engine 505 (step 620). The user also may select an item other than a single searchable object, such as a set of objects or an application for searching. The user's query is received and processed by the search engine (step 630). If user-level access controls are used, the search engine may generate appropriate access keys to restrict potential search results to only those containing data appropriate for the user's access levels (step 640). The search engine then performs the search (step 650) using indexed searchable data as described with respect to FIG. 5. The search may be performed using keyword matching, historical search result weighting, link analysis, and other search techniques known in the art. Search results may be rendered in the search interface (step 600). The search process may allow for iterative searching, with or without further user interaction. For example, initial search results may be used to generate further search queries, and/or the search query may be presented to the user with the search results for potential refinement and further searching.

A search modeler as described herein may provide or use an application-agnostic definition of a searchable RDBMS-oriented object. By providing, for example, an XML definition for such an object, the implementation-specific details for using and manipulating searchable data in a relational system may be abstracted, allowing for cross-application indexing and searching. For example, two enterprise applications in the same system may have extremely different underlying database structures and business logic systems. As a specific example, enterprise applications provided by different suppliers such as Siebel, PeopleSoft, and Oracle may have different structures and logic. However, if each application implements a communication end point as defined by a search modeler, searchable objects provided by each application may be uniform in structure. This can simplify crawling the relevant database objects and extracting searchable data.

FIGS. 7-10 show examples of user interfaces suitable for implementing and using a search modeler and searchable data definitions according to embodiments of the present invention. The search modeler may be web-based or may use other standard network protocols and interfaces.

FIG. 7 shows an example of a user interface for viewing and manipulating searchable objects in an enterprise application system according to an embodiment of the present invention. The interface may provide a search mechanism 705 with which a user can filter objects in an enterprise application or system. An example of a specific, non-limiting search and the resulting objects for an enterprise application are shown in FIG. 8A. Various information about searchable objects may be provided, including the object name 710, description 720, and categorization or other information 730. The interface also may allow a user to manipulate searchable objects by altering the searchable object definition 740, defining permissions and user access controls related to the searchable object 750, and deploying the searchable object for use by crawlers and indexing systems 760. Other information and functionality may be provided.

FIG. 8A shows an example of a user interface for viewing a searchable object using a search modeler according to an embodiment of the present invention. By using metadata associated with the entities, the search modeler can link each entity to other, semantically-related entities. For example, the search modeler interface may include an option 810 to display entities related to a selected entity. As a specific example, FIG. 8B shows an exemplary interface resulting from a selection of the "related entities" button for the entity "AP_EXPENSE_FEED_LINES_ALL" 801 in the interface shown in FIG. 8A. The related entities interface may show, for example, relationships 820 between related entities and the selected entity. Application-specific metadata may be included in or used by the interface. For example, a search modeler may allow a user to view all entities defined by application, select or search for an application-specific subset of entities, find entities related to a selected entity within the application, and show relationships between entities in the application.

Figures 9, 10:
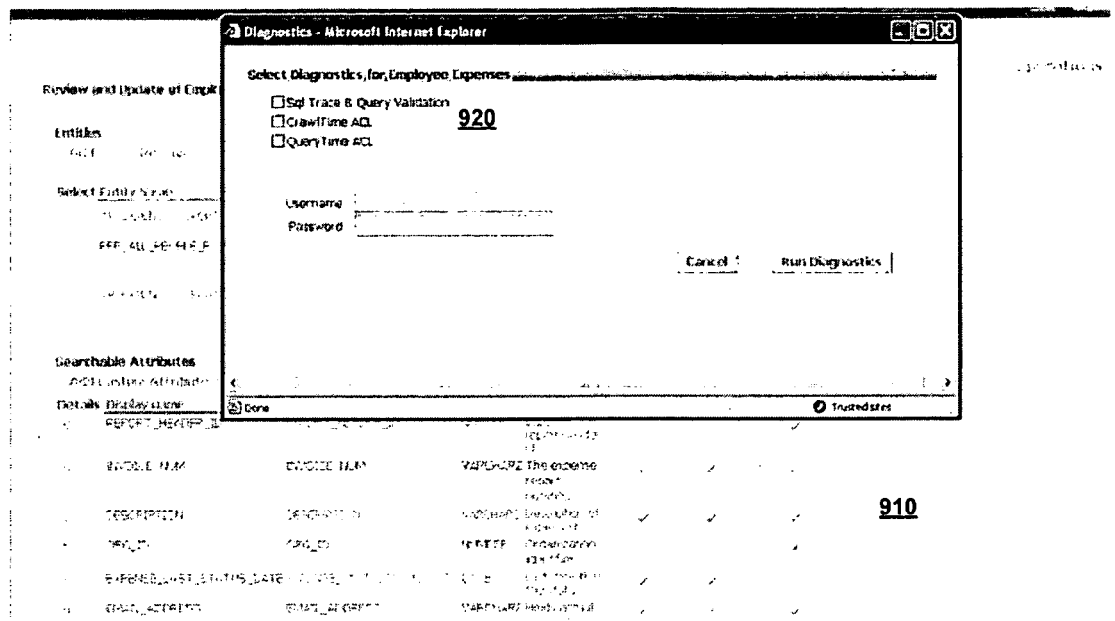
FIG. 9 shows an example of a user interface for performing a diagnostic verification of a searchable data definition according to an embodiment of the present invention.
FIG. 10 shows an example of a user interface having a value transformation according to an embodiment of the present invention.

FIG. 9 shows an example of a user interface for performing a diagnostic verification, such as a diagnostic search, of a searchable data definition according to an embodiment of the present invention. A set of parameters, such as table columns to be searched, may be indicated in a first portion of the interface 910. In a second interface or a second portion of the same interface 920, the user may indicate the type of diagnostic to run (e.g., "Trace & Query Validation"). If access controls are used, the diagnostic verification may be run using crawl-time and/or query-time authorization controls. Typically, a user can use any user access controls available to the user to perform the diagnostic verification. Other configurations also may be available to the user. For example, a user may define a diagnostic verification using end-user-specific access controls to analyze a search as it would be seen by an end user. Other controls may be specified.

As previously described, enterprise applications may store data in a relational system, such as an RDBMS system. One common goal in such systems is to remove data redundancy and represent the data in a normalized form. Thus, RDBMS-based applications may use database designs having specific structures that are not directly usable or not easily accessible by end users. As a specific example, RDBMS applications may store foreign key references stored separately from the primary data, with only a reference identifier maintained in the primary data. Such structures can imposes restrictions on the usability of normalized data for the end user. The interpretation of data is thus restricted to implementation-specific business logic.

To provide a crawl-time transformation of referenced data, a search modeler may include generic value transformation functionality. In some cases, the specific implementation of a transformation function is controlled by each application. FIG. 10 shows an example of a user interface having a value transformation according to an embodiment of the present invention. A user may select one or more attributes 1001 and indicate a transformation 1010 to be applied to the attribute. The transformation may convert relational or normalized data to a more user-accessible form, such as by replacing key constraints with user-readable labels or other text.

Figure 11:
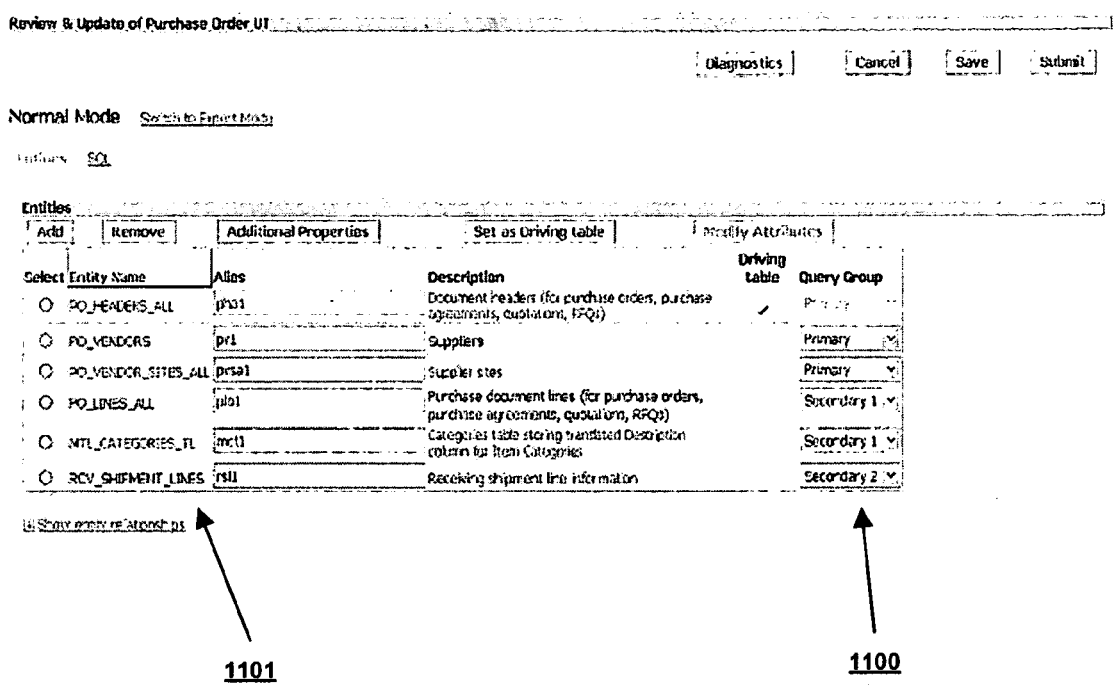
FIG. 11 shows an example user interface for managing entity grouping according to an embodiment of the invention.
Figure 12:
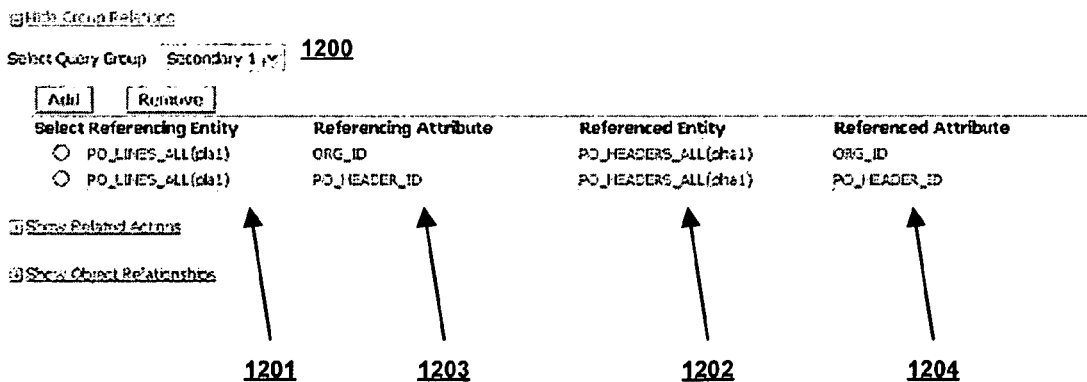
FIG. 12 shows an example user interface for managing entity grouping according to an embodiment of the invention.

In an embodiment, a search modeler may include options for managing the grouping of entities in a logical model as previously described. FIGS. 11-12 show example user interfaces for managing entity grouping according to embodiments of the invention. Each entity 1101 in a logical model may be identified as belonging to a master (primary) group or a child (secondary) group 1100. The group to which an entity is assigned may be stored in a searchable data definition. FIG. 12 shows an example interface for displaying the member entities of a selected group 1200. As shown, each referencing entity 1201 in a child group may be associated with a primary entity 1202 via a relationship between attributes 1203, 1204 of the entities.

In an embodiment, a search modeler may provide functionality that allows a user to define attributes for entities in a logical model. FIG. 13 shows an example user interface for manipulating and defining attributes for logical model entities according to an embodiment of the invention. As shown, example attributes of an entity include a display name 1301, an internal or other attribute name 1302, type 1303, and description 1304. Attributes also may represent various options 1310, such as wither the attribute contains or refers to searchable data, whether it should be displayed, etc. In an embodiment, a user may define custom attributes 1300. As a specific example, a user may define an attribute using SQL language functions. When searchable data is read from an application database, the functions may be executed to produce search results.

In an embodiment, the search modeler may allow a user to include an SQL or other direct database query or command as metadata in a searchable data definition, instead of specifying individual sources of data such as tables or views. FIG. 14 shows an example user interface for defining an attribute according to an embodiment of the invention. The attribute may be defined by an SQL statement 1400, which may be executed by a crawler to access searchable data stored in a database table referenced by the statement 1400.

In general, any enterprise application may be configured for use with a search modeler as described herein. A typical process for doing so includes implementing protocols used or defined by a search modeler, implementing a communication end point in the application to communicate with the modeler, and notifying the modeler of the presence and operation of the end point. An application may implement the search modeler protocols and a communication end point by providing a service that responds to requests sent by the search modeler. For example, the search modeler may include an XML schema that defines requests issued by the search modeler and the types of data that an application can return in response. The end point may receive requests and send responses using, for example, HTTP, SOAP, or other webservice protocols that may be specified by the search modeler. An application that implements a communication end point to respond to requests from a search modeler may be registered with the search modeler.

A simplified example of an XML searchable data definition is:

```
<?xml version="1.0" encoding="UTF-8"?>
<orcl:searchableBusinessObject
xmlns='http://www.oracle.com/apps/fnd/search/bo'
        xmlns:orcl='http://www.oracle.com/apps/fnd/search/bo'
        xmlns:xsi='http://www.w3.org/2001/XMLSchema-instance'
        xsi:schemaLocation='http://www.oracle.com/apps/fnd/search/bo
BusinessObject.xsd'>
        <orcl:searchObjectName>BIZOBJECT:Purchase_Order</orcl:searchObjectName>
        <orcl:searchObjectDisplayName><![CDATA[Purchase
Order]]></orcl:searchObjectDisplayName>
        <orcl:searchObjectDesc>
            <orcl:base-lang lang="en-us">Purchase Order</orcl:base-lang>
        </orcl:searchObjectDesc>
        <orcl:searchObjectModule>PO</orcl:searchObjectModule>
        <orcl:searchObjectType>RSO</orcl:searchObjectType>
        <orcl:metaData xmlns:meta='http://www.oracle.com/apps/fnd/search/rso'
                xmlns:xs='http://www.w3.org/2001/XMLSchema-instance'
                xs:schemaLocation='http://www.oracle.com/apps/fnd/search/rso
RelationalSearchableObject.xsd'
                xs:type="meta:relationalObjectType">
            <meta:relationalObject>
                <meta:ObjectName>BIZOBJECT:Purchase_Order</meta:ObjectName>
                <meta:ObjectDisplayName>Purchase Order</meta:ObjectDisplayName>
                <meta:objectDesc>
                    <orcl:base-lang lang="en-US">Purchase Order</orcl:base-
```

```
lang>
            </meta:ObjectDesc>
            <meta:objectModule>PO</meta:objectModule>
            <meta:taxonomyGroups>
                <meta:defaultTaxonomy name="PROD_FAMILY_TX">
                    <meta:class level="0"
name="PROD_FAMILY">MFG_PF</meta:class>
                    <meta:class level="1" name="PROD">PO</meta:class>
                </meta:defaultTaxonomy>
                <meta:taxonomy name="BIZ_FNC_TX">
                    <meta:class level="0" name="BIZ_FNC">ORD</meta:class>
                </meta:taxonomy>
            </meta:taxonomyGroups>
            <meta:actionableLinks>
                <meta:link type="URL">
                    <meta:name>Link 1</meta:name>
                    <meta:url>http://host:port</meta:url>
                        <meta:parameters>
                            <meta:parameter name="id" bind="id" />
                            <meta:parameter name="id1" bind="id1" />
                        </meta:parameters>
                    <meta:action>redirect</meta:action>
                </meta:link>
                <meta:link type="URL">
                    <meta:name>Link 2</meta:name>
                    <meta:url>http://host:port</meta:url>
                        <meta:parameters>
                            <meta:parameter name="id" bind="id" />
                            <meta:parameter name="id1" bind="id1" />
                        </meta:parameters>
                    <meta:action>redirect</meta:action>
                </meta:link>
            </meta:actionableLinks>
            <meta:objectProperties>
                <meta:objectType>BASEOBJECT</meta:objectType>
                <meta:objectLoc>http://local-
host:port/webservice/search/getBusinessObject</meta:objectLoc>
                <meta:properties>
                    <meta:property name="searchable" value="yes" />
                    <meta:property name="interface" value="no" />
                </meta:properties>
            </meta:objectProperties>
            <meta:searchProperties>
                <meta:baseObject>TABLE</meta:baseObject>
                <meta:commonProperties>
                    <meta:uiFunctionName>POXPOV</meta:uiFunctionName>
<meta:securityPlugin>oracle.apps.fnd.search.DefaultSearchPlugin</meta:securityPlugin>
                    <meta:drivingEntity>PO_HEADERS_ALL
pha</meta:drivingEntity>
                    <meta:visibilityLevel>GLOBAL</meta:visibilityLevel>
                </meta:commonProperties>
                <meta:crawlProperties>
                    <meta:incrementalCrawl>YES</meta:incrementalCrawl>
                    <meta:dateBasedCrawl>
<meta:dateColumn>PO_HEADERS_ALL.LAST_UPDATE_DATE</meta:dateColumn>
<meta:dateColumn>PO_HEADERS_ALL.CREATION_DATE</meta:dateColumn>
                    </meta:dateBasedCrawl>
                    <meta:businessEventCrawl>
<meta:businessEvent>oracle.apps.po.PoHeader.Insert</meta:businessEvent>
                    </meta:businessEventCrawl>
                </meta:crawlProperties>
            </meta:searchProperties>
            <meta:entityList groupNum="0">
                <meta:entity>
                    <meta:entityName>PO_HEADERS_ALL</meta:entityName>
                    <meta:entityAlias>PO_HEADERS_ALL</meta:entityAlias>
                    <meta:entityDesc>
                        <orcl:base-lang lang="en-US">Purchase Order
Header</orcl:base-lang>
                    </meta:entityDesc>
                    <meta:entityModule>PO</meta:entityModule>
                    <meta:entitySchema>APPS</meta:entitySchema>
                    <meta:entityType>TABLE</meta:entityType>
                    <meta:masterGroup/>
                    <meta:extendedProperties>
                        <meta:extension name="EnableAttachment"
```

-continued

```
value="yes"/>
                              <meta:extension name="EnableKFF" value="yes"/>
                              <meta:extension name="EnableDFF" value="no"/>
                       </meta:extendedProperties>
                       <meta:attributesList>
                              <meta:entityAttributes>
                                     <meta:primaryKey/>
<meta:attributeName>PO_HEADER_ID</meta:attributeName>
                                     <meta:attributeDisplayName>PoHeaderId-
1</meta:attributeDisplayName>
                                     <meta:attributeAlias>PO_HEADER_ID-
1</meta:attributeAlias>
                                     <meta:attributeDesc>
                                            <orcl:base-lang lang="en-us">Purchase Order
Header Id</orcl:base-lang>
                                     </meta:attributeDesc>
                                     <meta:dataType>NUMBER</meta:dataType>
                                     <meta:precision>22</meta:precision>
                                     <meta:nullable>NO</meta:nullable>
                              </meta:entityAttributes>
                              <meta:entityAttributes>
                                     <meta:uniqueKey/>
<meta:attributeName>SEGMENT1</meta:attributeName>
                                     <meta:attributeDesc>
                                            <orcl:base-lang lang="en-us">Purchase Order
Number</orcl:base-lang>
                                     </meta:attributeDesc>
                                     <meta:dataType>VARCHAR2</meta:dataType>
                                     <meta:precision>30</meta:precision>
                                     <meta:nullable>NO</meta:nullable>
                                     <meta:transform
type="lookup">INV_LOOKUPS::INV</meta:transform>
                              </meta:entityAttributes>
                              <meta:entityAttributes>
                                     <meta:uniqueKey/>
<meta:attributeName>VENDOR_ID</meta:attributeName>
                                     <meta:attributeDesc>
                                            <orcl:base-lang lang="en-us">Vendor or
Supplier Id</orcl:base-lang>
                                     </meta:attributeDesc>
                                     <meta:dataType>NUMBER</meta:dataType>
                                     <meta:precision>22</meta:precision>
                                     <meta:nullable>NO</meta:nullable>
                              </meta:entityAttributes>
                              <meta:entityAttributes>
<meta:attributeName>MATCH_TYPE</meta:attributeName>
                                     <meta:attributeDesc>
                                            <orcl:base-lang lang="en-us">PO Match
Type</orcl:base-lang>
                                     </meta:attributeDesc>
                                     <meta:dataType>VARCHAR2</meta:dataType>
                                     <meta:precision>30</meta:precision>
                                     <meta:nullable>NO</meta:nullable>
                                     <meta:searchProperties>
                                            <meta:isIndexed/>
                                            <meta:isTitle/>
                                            <meta:isKey/>
                                            <meta:isStored/>
                                            <meta:isLanguage/>
                                            <meta:isAttachment/>
                                            <meta:isDateBased/>
                                            <meta:isDisplayed/>
                                            <meta:isSecured/>
                                            <meta:weight>1</meta:weight>
                                            <meta:uiParam>MatchType</meta:uiParam>
<meta:visibilityLevel>GLOBAL</meta:visibilityLevel>
                                     </meta:searchProperties>
                              </meta:entityAttributes>
                       </meta:attributesList>
                </meta:entity>
                <meta:entityRelations>
                       <meta:relation type="STRONG" mode="DERIVED">
                              <meta:referencingEntity>
<meta:entityName>MTL_ABC_ASSIGNMENTS</meta:entityName>
                                     <meta:entityModule>INV</meta:entityModule>
                                     <meta:entitySchema>APPS</meta:entitySchema>
                              </meta:referencingEntity>
                              <meta:referencedEntity>
```

-continued

```
<meta:entityName>MTL_ABC_ASSGN_GROUP_CLASSES</meta:entityName>
        <meta:entityModule>INV</meta:entityModule>
        <meta:entitySchema>APPS</meta:entitySchema>
    </meta:referencedEntity>
    <meta:attributeMap fromAttr="ASSIGNMENT_GROUP_ID" toAttr="ASSIGNMENT_GROUP_ID" />
</meta:relation>
<meta:relation type="STRONG" mode="CUSTOM">
    <meta:referencingEntity>
        <meta:entityName>MTL_ABC_ASSIGNMENTS</meta:entityName>
        <meta:entityModule>INV</meta:entityModule>
        <meta:entitySchema>APPS</meta:entitySchema>
    </meta:referencingEntity>
    <meta:referencedEntity>
        <meta:entityName>MTL_ABC_ASSGN_GROUP_CLASSES</meta:entityName>
        <meta:entityModule>INV</meta:entityModule>
        <meta:entitySchema>APPS</meta:entitySchema>
    </meta:referencedEntity>
    <meta:attributeMap fromAttr="ABC_CLASS_ID" toAttr="ABC_CLASS_ID" />
</meta:relation>
<meta:relation type="STRONG" mode="DERIVED">
    <meta:referencingEntity>
        <meta:entityName>MTL_ABC_ASSIGNMENTS</meta:entityName>
        <meta:entityModule>INV</meta:entityModule>
        <meta:entitySchema>APPS</meta:entitySchema>
    </meta:referencingEntity>
    <meta:referencedEntity>
        <meta:entityName>MTL_ABC_ASSIGNMENT_GROUPS</meta:entityName>
        <meta:entityModule>INV</meta:entityModule>
        <meta:entitySchema>APPS</meta:entitySchema>
    </meta:referencedEntity>
    <meta:attributeMap fromAttr="ASSIGNMENT_GROUP_ID" toAttr="ASSIGNMENT_GROUP_ID" />
</meta:relation>
<meta:relation type="STRONG" mode="DERIVED">
    <meta:referencingEntity>
        <meta:entityName>MTL_ABC_ASSGN_GROUP_CLASSES</meta:entityName>
        <meta:entityModule>INV</meta:entityModule>
        <meta:entitySchema>APPS</meta:entitySchema>
    </meta:referencingEntity>
    <meta:referencedEntity>
        <meta:entityName>MTL_ABC_ASSIGNMENT_GROUPS</meta:entityName>
        <meta:entityModule>INV</meta:entityModule>
        <meta:entitySchema>APPS</meta:entitySchema>
    </meta:referencedEntity>
    <meta:attributeMap fromAttr="ASSIGNMENT_GROUP_ID" toAttr="ASSIGNMENT_GROUP_ID" />
</meta:relation>
<meta:relation type="STRONG" mode="CUSTOM">
    <meta:referencingEntity>
        <meta:entityName>MTL_ABC_ASSGN_GROUP_CLASSES</meta:entityName>
        <meta:entityModule>INV</meta:entityModule>
        <meta:entitySchema>APPS</meta:entitySchema>
    </meta:referencingEntity>
    <meta:referencedEntity>
        <meta:entityName>MTL_ABC_CLASSES</meta:entityName>
        <meta:entityModule>INV</meta:entityModule>
        <meta:entitySchema>APPS</meta:entitySchema>
    </meta:referencedEntity>
    <meta:attributeMap fromAttr="ABC_CLASS_ID" toAttr="ABC_CLASS_ID" />
</meta:relation>
<meta:relation type="STRONG" mode="DERIVED">
    <meta:referencingEntity>
        <meta:entityName>MTL_ABC_ASSIGNMENTS</meta:entityName>
        <meta:entityModule>INV</meta:entityModule>
        <meta:entitySchema>APPS</meta:entitySchema>
    </meta:referencingEntity>
    <meta:referencedEntity>
        <meta:entityName>MTL_ABC_CLASSES</meta:entityName>
        <meta:entityModule>INV</meta:entityModule>
        <meta:entitySchema>APPS</meta:entitySchema>
    </meta:referencedEntity>
    <meta:attributeMap fromAttr="ABC_CLASS_ID" toAttr="ABC_CLASS_ID" />
</meta:relation>
<meta:relation type="STRONG" mode="DERIVED">
    <meta:referencingEntity>
```

```xml
<meta:entityName>MTL_ABC_ASSIGNMENT_GROUPS</meta:entityName>
                                <meta:entityModule>INV</meta:entityModule>
                                <meta:entitySchema>APPS</meta:entitySchema>
                        </meta:referencingEntity>
                        <meta:referencedEntity>
<meta:entityName>MTL_ABC_COMPILE_HEADERS</meta:entityName>
                                <meta:entityModule>INV</meta:entityModule>
                                <meta:entitySchema>APPS</meta:entitySchema>
                        </meta:referencedEntity>
                        <meta:attributeMap fromAttr="COMPILE_ID" toAttr="COMPILE_ID" />
                    </meta:relation>
                    <meta:relation type="STRONG" mode="DERIVED">
                        <meta:referencingEntity>
<meta:entityName>MTL_ABC_COMPILES</meta:entityName>
                                <meta:entityModule>INV</meta:entityModule>
                                <meta:entitySchema>APPS</meta:entitySchema>
                        </meta:referencingEntity>
                        <meta:referencedEntity>
<meta:entityName>MTL_ABC_COMPILE_HEADERS</meta:entityName>
                                <meta:entityModule>INV</meta:entityModule>
                                <meta:entitySchema>APPS</meta:entitySchema>
                        </meta:referencedEntity>
                        <meta:attributeMap fromAttr="COMPILE_ID" toAttr="COMPILE_ID" />
                    </meta:relation>
                </meta:entityRelations>
                <meta:addnPredicate>
                    <![CDATA[any predicate]]>
                </meta:addnPredicate>
                <meta:queryHint>
                    <![CDATA[any query hint]]>
                </meta:queryHint>
                <meta:SQL>
                    <![CDATA[expert mode SQL]]>
                </meta:SQL>
            </meta:entityList>
            <meta:groupLinks groupNum="1">
                <meta:link>
                    <meta:linkingEntity>
<meta:entityName>MTL_ABC_ASSIGNMENT_GROUPS</meta:entityName>
                            <meta:entityModule>INV</meta:entityModule>
                            <meta:entitySchema>APPS</meta:entitySchema>
                    </meta:linkingEntity>
                    <meta:linkedEntity>
<meta:entityName>MTL_ABC_COMPILE_HEADERS</meta:entityName>
                            <meta:entityModule>INV</meta:entityModule>
                            <meta:entitySchema>APPS</meta:entitySchema>
                    </meta:linkedEntity>
                    <meta:attributeMap fromAttr="COMPILE_ID" toAttr="COMPILE_ID" />
                </meta:link>
                <meta:link>
                    <meta:linkingEntity>
<meta:entityName>MTL_ABC_COMPILES</meta:entityName>
                            <meta:entityModule>INV</meta:entityModule>
                            <meta:entitySchema>APPS</meta:entitySchema>
                    </meta:linkingEntity>
                    <meta:linkedEntity>
<meta:entityName>MTL_ABC_COMPILE_HEADERS</meta:entityName>
                            <meta:entityModule>INV</meta:entityModule>
                            <meta:entitySchema>APPS</meta:entitySchema>
                    </meta:linkedEntity>
                    <meta:attributeMap fromAttr="COMPILE_ID" toAttr="COMPILE_ID" toAttrDataType="VARCHAR"/>
                </meta:link>
            </meta:groupLinks>
        </meta:relationalObject>
    </orcl:metaData>
</orcl:searchableBusinessObject>
```

An example XML Schema for a searchable business object is:

```
<?xml version="1.0" encoding="UTF-8"?>
<!--
```

```
businessObject
    |
    +- objectName
    |
```

```
            +- taxononmyGroups
            |    |
            |    +- defaultTaxonomy
            |    |    |
            |    |    +- {class (level, key, value, code)}
            |    |
            |    +-{taxonomy}
            |    |
            |    |    +-{class (level, key, value, code)}
            |
            +- objectProperties
            |    |
            |    +- objectType
            |    |
            |    +- {[property(key, value)]}
            |
            +- searchProperties
            |    |
            |    +- baseObject
            |    |
            |    +- commonProperties
            |    |    |
            |    |    +- uiFunctionName
            |    |    |
            |    |    +- securityPlugin
            |    |    |
            |    |    +- drivingEntity
            |    |
            |    +- crawlProperties
            |    |    |
            |    |    +- incrementalCrawl
            |
******************************************
            |
            +- entityList
            |    |
            |    +- {entity}
            |    |    |
            |    |    +- entityName, entityDesc, entityModule,
entitySchema
            |    |    |
            |    |    +- searchProperties
            |    |    |    |
            |    |    |    +- {property}
            |    |    |
            |    |    +- attributesList
            |    |    |    |
            |    |    |    +- entityAttributes
            |    |    |    |    |
            |    |    |    |    +- [primaryKey], [uniqueKey],
attributeName, attributeDesc,
                                        dataType, precision,
nullable
            |    |    |    |
            |    |    |    +- searchProperties
            |    |    |         +- isIndexed, isTitle, isKey,
isStored, isDisplayed
            |    |
            |    +- entityRelations
            |    |    |
            |    |    +- {relation (name)}
            |    |    |    |
            |    |    |    +- referencingEntity
            |    |    |    |    |
            |    |    |    |    +- entityName, entityModule,
entitySchema
            |    |    |    |
            |    |    |    +- referencedEntity
            |    |    |    |    |
            |    |    |    |    +- entityName, entityModule,
entitySchema
            |    |    |    |
            |    |    |    +- {attributeMap (fromAttr, toAttr)}
            |
            ***************** OR ********************
            |
            +- objectList
-->
```

```xml
<xsd:schema  xmlns:xsd="http://www.w3.org/2001/
             XMLSchema"
             targetNamespace="http://www.oracle.com/
             apps/fnd/search/rso"
             xmlns="http://www.oracle.com/apps/fnd/
             search/rso"
             xmlns:app="http://www.oracle.com/apps/
             fnd/search/rso"
             xmlns:bo="http://www.oracle.com/apps/
             fnd/search/bo"
             elementFormDefault="qualified">
    <xsd:import namespace="http://www.oracle.com/apps/
fnd/search/bo" schemaLocation="BusinessObject.xsd" />
    <!-- L1 Type Definitions -->
    <xsd:simpleType name="yesNoType">
        <xsd:restriction base="xsd:string">
            <xsd:enumeration value="YES" />
            <xsd:enumeration value="NO" />
        </xsd:restriction>
    </xsd:simpleType>
    <xsd:complexType name="nameType">
        <xsd:complexContent>
            <xsd:extension base="bo:nameType"/>
        </xsd:complexContent>
    </xsd:complexType>
    <xsd:complexType name="descType">
        <xsd:complexContent>
            <xsd:extension base="bo:descType/>
        </xsd:complexContent>
    </xsd:complexType>
    <xsd:complexType name="taxonomyClassType">
        <xsd:simpleContent>
            <xsd:extension base="xsd:string">
                <xsd:attribute name="level" type=
"xsd:nonNegativeInteger" use="required" />
                <xsd:attribute name="name" type="xsd:string"
use="required" />
            </xsd:extension>
        </xsd:simpleContent>
    </xsd:complexType>
    <xsd:complexType name="parameterType">
        <xsd:attribute name="name" type="xsd:string" use=
"required" />
        <xsd:attribute name="bind" type="xsd:string" use=
"required" />
    </xsd:complexType>
    <xsd:complexType name="objectPropertiesType">
        <xsd:attribute name="name" type="xsd:string"
use="required" />
        <xsd:attribute name="value" type="xsd:string"
use="required" />
    </xsd:complexType>
    <xsd:simpleType name="objectType">
        <xsd:restriction base="xsd:string">
            <xsd:enumeration value="BASEOBJECT" />
            <xsd:enumeration value="REMOTEOBJECT" />
            <xsd:enumeration value="EXTNOBJECT" />
        </xsd:restriction>
    </xsd:simpleType>
    <xsd:simpleType name="entityObjectType">
        <xsd:restriction base="xsd:string">
            <xsd:enumeration value="TABLE" />
            <xsd:enumeration value="VIEW" />
            <xsd:enumeration value="SQL" />
        </xsd:restriction>
    </xsd:simpleType>
    <xsd:simpleType name="visibilityType">
        <xsd:restriction base="xsd:string">
            <xsd:enumeration value="GLOBAL" />
            <xsd:enumeration value="GUEST" />
            <xsd:enumeration value="GROUP" />
            <xsd:enumeration value="USER" />
        </xsd:restriction>
    </xsd:simpleType>
    <xsd:simpleType name="weightType">
        <xsd:restriction base="xsd:string">
            <xsd:enumeration value="1" />
            <xsd:enumeration value="2" />
            <xsd:enumeration value="3" />
            <xsd:enumeration value="4" />
```

```
        <xsd:enumeration value="5" />
        <xsd:enumeration value="6" />
    </xsd:restriction>
</xsd:simpleType>
<xsd:complexType name="commonPropertiesType">
    <xsd:sequence>
        <xsd:element name="uiFunctionName" type=
"xsd:string" minOccurs="1" maxOccurs="1" />
        <xsd:element name="securityPlugin" type="xsd:string"
minOccurs="1" maxOccurs="1" />
        <xsd:element name="drivingEntity" type="xsd:string"
minOccurs="1" maxOccurs="1" />
        <xsd:element name="visibilityLevel" type="app:visibilityType"
default="GLOBAL" minOccurs="0" maxOccurs="1" />
    </xsd:sequence>
</xsd:complexType>
<xsd:complexType name="crawlPropertiesType">
    <xsd:sequence>
        <xsd:element name="incrementalCrawl" type=
"xsd:string" minOccurs="1" maxOccurs="1" />
        <xsd:element name="dateBasedCrawl" type=
"app:dateColType" minOccurs="0" />
        <xsd:element name="businessEventCrawl"
type="app:bizEventType" minOccurs="0" />
    </xsd:sequence>
</xsd:complexType>
<xsd:complexType name="extensionPropType">
    <xsd:attribute name="name" type="xsd:string" />
    <xsd:attribute name="value" type="xsd:string" />
</xsd:complexType>
<xsd:complexType name="searchPropType">
    <xsd:sequence>
        <xsd:element name="isIndexed" type="xsd:string"
fixed="YES" minOccurs="0" maxOccurs="1" />
        <xsd:element name="isTitle" type="xsd:string"
fixed="YES" minOccurs="0" maxOccurs="1" />
        <xsd:element name="isKey" type="xsd:string"
fixed="YES" minOccurs="0" maxOccurs="1" />
        <xsd:element name="isStored" type="xsd:string"
fixed="YES" minOccurs="0" maxOccurs="1" />
        <xsd:element name="isLanguage" type="xsd:string"
fixed="YES" minOccurs="0" maxOccurs="1" />
        <xsd:element name="isAttachment" type="xsd:string"
fixed="YES" minOccurs="0" maxOccurs="1" />
        <xsd:element name="isDateBased" type="xsd:string"
fixed="YES" minOccurs="0" maxOccurs="1" />
        <xsd:element name="isDisplayed" type="xsd:string"
fixed="YES" minOccurs="0" maxOccurs="1" />
        <xsd:element name="isSecured" type="xsd:string"
fixed="YES" minOccurs="0" maxOccurs="1" />
        <xsd:element name="weight" type="app:weightType"
default="1" minOccurs="0" maxOccurs="1" />
        <xsd:element name="uiParam" type="xsd:string"
minOccurs="0" maxOccurs="1" />
        <xsd:element name="visibilityLevel" type=
"app:visibilityType" default="GLOBAL" minOccurs="0"
maxOccurs="1" />
    </xsd:sequence>
</xsd:complexType>
<xsd:complexType name="transformType">
    <xsd:simpleContent>
        <xsd:extension base="xsd:string">
            <xsd:attribute name="type" type="xsd:string"
use="required"/>
        </xsd:extension>
    </xsd:simpleContent>
</xsd:complexType>
<xsd:complexType name="entityAttributesType">
    <xsd:sequence>
        <xsd:choice minOccurs="0" maxOccurs="1">
            <xsd:element name="primaryKey" type="xsd:string"
fixed="PK" minOccurs="0" maxOccurs="1" />
            <xsd:element name="uniqueKey" type="xsd:string"
fixed="PK" minOccurs="0" maxOccurs="1" />
        </xsd:choice>
        <xsd:sequence>
            <xsd:element name="attributeName"
type="xsd:string" minOccurs="1" maxOccurs="1" />
            <xsd:element name="attributeDisplayName"
type="xsd:string" minOccurs="0" maxOccurs="1" />
            <xsd:element name="attributeAlias" type=
"xsd:string" minOccurs="0" maxOccurs="1" />
            <xsd:element name="attributeDesc" type=
"app:descType" minOccurs="1" maxOccurs="1" />
            <xsd:element name="dataType" type="xsd:string"
minOccurs="1" maxOccurs="1" />
            <xsd:element name="precision" type="xsd:string"
minOccurs="1" maxOccurs="1" />
            <xsd:element name="nullable" type=
"app:yesNoType" minOccurs="1" maxOccurs="1" />
        </xsd:sequence>
        <xsd:sequence>
            <xsd:element name="transform" type=
"app:transformType" minOccurs="0" maxOccurs="1" />
        </xsd:sequence>
        <xsd:sequence>
            <xsd:element name="searchProperties"
type="app:searchPropType" minOccurs="0" maxOccurs="1" />
        </xsd:sequence>
    </xsd:sequence>
</xsd:complexType>
<xsd:complexType name="bizObjectType">
    <xsd:sequence>
        <xsd:element name="objectName" type="xsd:string"
minOccurs="1" maxOccurs="1" />
        <xsd:element name="objectDesc" type="app:descType"
minOccurs="1" maxOccurs="1" />
        <xsd:element name="objectLoc" type="xsd:string"
minOccurs="1" maxOccurs="1" />
    </xsd:sequence>
</xsd:complexType>
<xsd:simpleType name="weakStrongRelType">
    <xsd:restriction base="xsd:string">
        <xsd:enumeration value="WEAK" />
        <xsd:enumeration value="STRONG" />
    </xsd:restriction>
</xsd:simpleType>
<xsd:simpleType name="RelMode">
    <xsd:restriction base="xsd:string">
        <xsd:enumeration value="DERIVED" />
        <xsd:enumeration value="CUSTOM" />
    </xsd:restriction>
</xsd:simpleType>
<xsd:complexType name="entityInRelType">
    <xsd:sequence>
        <xsd:element name="entityName" type="xsd:string"
minOccurs="1" maxOccurs="1" />
        <xsd:element name="entityModule" type="xsd:string"
minOccurs="1" maxOccurs="1" />
        <xsd:element name="entitySchema" type="xsd:string"
minOccurs="1" maxOccurs="1" />
    </xsd:sequence>
</xsd:complexType>
<xsd:complexType name="attributeMapType">
    <xsd:attribute name="fromAttr" type="xsd:string" />
    <xsd:attribute name="toAttr" type="xsd:string" />
    <xsd:attribute name="toAttrDataType" type=
"xsd:string" />
</xsd:complexType>
<xsd:complexType name="refRemoteObjectType">
    <xsd:sequence>
        <xsd:element name="objectName" type="xsd:string" />
        <xsd:element name="objectDesc" type=
"app:descType" />
        <xsd:element name="objectLoc" type="xsd:string" />
    </xsd:sequence>
</xsd:complexType>
<xsd:simpleType name="objRelType">
    <xsd:restriction base="xsd:string">
        <xsd:enumeration value="REMOTEREF" />
        <xsd:enumeration value="UNION" />
        <xsd:enumeration value="EXTENDBASE" />
    </xsd:restriction>
</xsd:simpleType>
<xsd:complexType name="objectRelationType">
    <xsd:sequence>
        <xsd:element name="attribute" type="xsd:string"
minOccurs="0" maxOccurs="1" />
        <xsd:element name="value" type="xsd:string"
```

```
    minOccurs="0" maxOccurs="1" />
  </xsd:sequence>
  <xsd:attribute name="type" type="app:objRelType"
    use="required" />
</xsd:complexType>
<xsd:complexType name="dateColType">
  <xsd:sequence>
    <xsd:element name="dateColumn" type="xsd:string"
    minOccurs="0" maxOccurs="5"/>
  </xsd:sequence>
</xsd:complexType>
<xsd:complexType name="bizEventType">
  <xsd:sequence>
    <xsd:element name="businessEvent" type="xsd:string"
    minOccurs="0" maxOccurs="5"/>
  </xsd:sequence>
</xsd:complexType>
<!-- L2 Type Definition -->
<xsd:complexType name="taxonomyType">
  <xsd:sequence>
    <xsd:element name="class" type=
"app:taxonomyClassType" minOccurs="1" maxOccurs="30" />
  </xsd:sequence>
  <xsd:attribute name="name" type="xsd:string" use=
    "required" />
</xsd:complexType>
<xsd:complexType name="actionablelinkType">
  <xsd:sequence>
    <xsd:element name="name" type="xsd:string"
    minOccurs="1" maxOccurs="1" />
    <xsd:element name="url" type="xsd:string"
    minOccurs="1" maxOccurs="1" />
    <xsd:element name="parameters" minOccurs="1"
      maxOccurs="1">
      <xsd:complexType>
        <xsd:sequence>
          <xsd:element name="parameter"
type="app:parameterType" minOccurs="1" maxOccurs="10" />
        </xsd:sequence>
      </xsd:complexType>
    </xsd:element>
    <xsd:element name="action" type="xsd:string"
    minOccurs="1" maxOccurs="1" />
  </xsd:sequence>
  <xsd:attribute name="type" type="xsd:string"
    use="required" />
</xsd:complexType>
<xsd:complexType name="extensionPropertiesType">
  <xsd:sequence>
    <xsd:element name="extension" type=
"app:extensionPropType" minOccurs="0" maxOccurs="30" />
  </xsd:sequence>
</xsd:complexType>
<xsd:complexType name="entityType">
  <xsd:sequence>
    <xsd:element name="entityName" type="xsd:string"
      minOccurs="1"
maxOccurs="1" />
    <xsd:element name="entityAlias" type="xsd:string"
    minOccurs="0" maxOccurs="1" />
    <xsd:element name="entityDesc" type="app:descType"
    minOccurs="1" maxOccurs="1" />
    <xsd:element name="entityModule" type="xsd:string"
    minOccurs="1" maxOccurs="1" />
    <xsd:element name="entitySchema" type="xsd:string"
    minOccurs="1" maxOccurs="1" />
    <xsd:element name="entityType" type=
"app:entityObjectType" minOccurs="1" maxOccurs="1" />
    <xsd:choice minOccurs="0" maxOccurs="1">
      <xsd:element name="masterGroup" type="xsd:string"
fixed="GRP" minOccurs="0" maxOccurs="1" />
      <xsd:element name="detailGroup" type="xsd:string"
fixed="GRP" minOccurs="0" maxOccurs="1" />
    </xsd:choice>
    <xsd:element name="extendedProperties" type=
"app:extensionPropertiesType" minOccurs="0" maxOccurs=
"1" />
    <xsd:element name="attributesList" minOccurs="1"
      maxOccurs="1" />
      <xsd:complexType>
        <xsd:sequence>
          <xsd:element name="entityAttributes" type=
"app:entityAttributesType" minOccurs="1" maxOccurs=
"unbounded" />
        </xsd:sequence>
      </xsd:complexType>
    </xsd:element>
  </xsd:sequence>
</xsd:complexType>
<xsd:complexType name="entityRelationType">
  <xsd:sequence>
    <xsd:element name="referencingEntity"
type="app:entityInRelType" minOccurs="1" maxOccurs="1" />
    <xsd:element name="referencedEntity" type=
"app:entityInRelType" minOccurs="1" maxOccurs="1" />
    <xsd:element name="attributeMap" type=
"app:attributeMapType" minOccurs="1" maxOccurs="1" />
  </xsd:sequence>
  <xsd:attribute name="type" type=
"app:weakStrongRelType" use="required" />
  <xsd:attribute name="mode" type="app:RelMode"
use="required" />
</xsd:complexType>
<xsd:complexType name="groupLinkType">
  <xsd:sequence>
    <xsd:element name="linkingEntity" type=
"app:entityInRelType" minOccurs="1" maxOccurs="1" />
    <xsd:element name="linkedEntity" type=
"app:entityInRelType" minOccurs="1" maxOccurs="1" />
    <xsd:element name="attributeMap" type=
"app:attributeMapType" minOccurs="1" maxOccurs="1" />
  </xsd:sequence>
</xsd:complexType>
<!-- L3 Type Definition -->
<xsd:group name="taxonomyGroup">
  <xsd:sequence>
    <xsd:element name="defaultTaxonomy" type=
"app:taxonomyType" minOccurs="1" maxOccurs="1" />
    <xsd:element name="taxonomy" type=
"app:taxonomyType" minOccurs="0" maxOccurs="30" />
  </xsd:sequence>
</xsd:group>
<xsd:group name="actionableLinksGroup">
  <xsd:sequence>
    <xsd:element name="link" type=
"app:actionablelinkType" minOccurs="0" maxOccurs="10" />
  </xsd:sequence>
</xsd:group>
<xsd:group name="objectPropertiesGroup">
  <xsd:sequence>
    <xsd:element name="objectType" type=
"app:objectType" minOccurs="1" maxOccurs="1" />
    <xsd:element name="objectLoc" type="xsd:string"
    minOccurs="1" maxOccurs="1" />
    <xsd:element name="properties" minOccurs="1"
      maxOccurs="1" />
      <xsd:complexType>
        <xsd:sequence>
          <xsd:element name="property" type=
"app:objectPropertiesType" minOccurs="1" maxOccurs=
"30" />
        </xsd:sequence>
      </xsd:complexType>
    </xsd:element>
  </xsd:sequence>
</xsd:group>
<xsd:group name="searchPropertiesGroup">
  <xsd:sequence>
    <xsd:element name="baseObject" type="xsd:string"
    minOccurs="1" maxOccurs="1" />
    <xsd:element name="commonProperties" type=
"app:commonPropertiesType" minOccurs="1" maxOccurs=
"1" />
    <xsd:element name="crawlProperties" type=
```

-continued

```
"app:crawlPropertiesType" minOccurs="1" maxOccurs=
"1" />
        <xsd:element name="extendedProperties" type=
"app:extensionPropertiesType" minOccurs="0" maxOccurs=
"1" />
      </xsd:sequence>
    </xsd:group>
    <xsd:complexType name="entityListType">
      <xsd:sequence>
        <xsd:element name="entity" type="app:entityType"
minOccurs="1" maxOccurs="10" />
        <xsd:element name="entityRelations" minOccurs="1"
maxOccurs="1" />
          <xsd:complexType>
            <xsd:group ref="app:entityRelationGroup" />
          </xsd:complexType>
        </xsd:element>
        <xsd:element name="addnPredicate" type="xsd:string"
minOccurs="0" maxOccurs="1" />
        <xsd:element name="queryHint" type="xsd:string"
minOccurs="0" maxOccurs="1" />
        <xsd:element name="SQL" type="xsd:string"
minOccurs="0" maxOccurs="1" />
      </xsd:sequence>
      <xsd:attribute name="groupNum" type="xsd:string" />
    </xsd:complexType>
    <xsd:complexType name="objectListType">
      <xsd:sequence>
        <xsd:element name="object" type="app:bizObjectType"
minOccurs="1" maxOccurs="10" />
      </xsd:sequence>
    </xsd:complexType>
    <xsd:group name="entityRelationGroup">
      <xsd:sequence>
        <xsd:element name="relation" type=
"app:entityRelationType" minOccurs="0" maxOccurs="30" />
      </xsd:sequence>
    </xsd:group>
    <xsd:group name="groupLinkGroup">
      <xsd:sequence>
        <xsd:element name="link" type="app:groupLinkType"
minOccurs="0"
maxOccurs="30" />
      </xsd:sequence>
    </xsd:group>
    <xsd:group name="objectRelationGroup">
      <xsd:choice>
        <xsd:sequence>
          <xsd:element name="relation" type=
"app:objectRelationType" minOccurs="1" maxOccurs="1" />
        </xsd:sequence>
      </xsd:choice>
    </xsd:group>
    <!-- Document Content declaration -->
    <xsd:complexType name="rsoType">
      <xsd:sequence>
        <xsd:element name="objectName" type=
"app:nameType" />
        <xsd:element name="objectDisplayName"
type="app:nameType" />
        <xsd:element name="objectDesc" type=
"app:descType" />
        <xsd:element name="objectModule" type=
"app:nameType" />
```

-continued

```
        <xsd:element name="taxonomyGroups" minOccurs="1"
maxOccurs="1" />
          <xsd:complexType>
            <xsd:group ref="app:taxonomyGroup" />
          </xsd:complexType>
        </xsd:element>
        <xsd:element name="actionableLinks" minOccurs="1"
maxOccurs="1" />
          <xsd:complexType>
            <xsd:group ref="app:actionableLinksGroup" />
          </xsd:complexType>
        </xsd:element>
        <xsd:element name="objectProperties" minOccurs="1"
maxOccurs="1" />
          <xsd:complexType>
            <xsd:group ref="app:objectPropertiesGroup" />
          </xsd:complexType>
        </xsd:element>
        <xsd:element name="searchProperties" minOccurs="0"
maxOccurs="1" />
          <xsd:complexType>
            <xsd:group ref="app: searchPropertiesGroup" />
          </xsd:complexType>
        </xsd:element>
        <xsd:choice>
          <xsd:sequence>
            <xsd:element name="entityList"
type="app:entityListType" minOccurs="1" maxOccurs="5" />
            <xsd:element name="groupLinks" minOccurs="0"
maxOccurs="5" />
              <xsd:complexType>
                <xsd:group ref="app:groupLinkGroup" />
                <xsd:attribute name="groupNum"
type="xsd:string" />
              </xsd:complexType>
            </xsd:element>
          </xsd:sequence>
          <xsd:sequence>
            <xsd:element name="objectList"
type="app:objectListType" minOccurs="1" maxOccurs="1" />
            <xsd:element name="objectRelations"
minOccurs="1" maxOccurs="2">
              <xsd:complexType>
                <xsd:group ref="app:objectRelationGroup" />
              </xsd:complexType>
            </xsd:element>
          </xsd:sequence>
        </xsd:choice>
      </xsd:sequence>
    </xsd:complexType>
    <xsd:complexType name="relationalObjectType">
      <xsd:complexContent>
        <xsd:extension base="bo:businessObject">
          <xsd:sequence>
            <xsd:element name="relationalObject"
type="app:rsoType" />
          </ xsd:sequence>
        </ xsd:extension>
      </xsd:complexContent>
    </xsd:complexType>
    <xsd:element name="relationalObject" type="app:rsoType" />
</xsd:schema>
```

An example XML Schema for a searchable business object is:

```
<?xml version="1.0" encoding="UTF-8"?>
<!--
    searchableBusinessObject
       |
       +– objectName
       |
       +– displayName
       |
       +– {description}
       |
```

```
            +- module
            |
            +- objectType
            |
            +- metaData
-->
<xsd:schema xmlns:xsd="http://www.w3.org/2001/XMLSchema"
            targetNamespace="http://www.oracle.com/apps/fnd/search/bo"
            xmlns="http://www.oracle.com/apps/fnd/search/bo"
            xmlns:bo="http://www.oracle.com/apps/fnd/search/bo"
            elementFormDefault="qualified">
    <xsd:complexType name="nameType">
        <xsd:simpleContent>
            <xsd:extension base="xsd:string" />
        </xsd:simpleContent>
    </xsd:complexType>
    <xsd:complexType name="langDescType">
        <xsd:simpleContent>
            <xsd:extension base="xsd:string">
                <xsd:attribute name="lang" type="xsd:string" use="optional" default="en-us"/>
            </xsd:extension>
        </xsd:simpleContent>
    </xsd:complexType>
    <xsd:complexType name="descType">
        <xsd:sequence>
            <xsd:element name="base-lang" type="bo:langDescType" minOccurs="1" maxOccurs="1" />
            <xsd:element name="lang" type="bo:langDescType" minOccurs="0" maxOccurs="unbounded" />
        </xsd:sequence>
    </xsd:complexType>
    <xsd:complexType name="businessObject" abstract="true" />
    <!-- Document Content declaration -->
    <xsd:element name="searchableBusinessObject">
        <xsd:complexType>
            <xsd:sequence>
                <xsd:element name="searchObjectName" type="bo:nameType" />
                <xsd:element name="searchObjectDisplayName" type="bo:nameType" />
                <xsd:element name="searchObjectDesc" type="bo:descType" />
                <xsd:element name="searchObjectModule" type="bo:nameType" />
                <xsd:element name="searchObjectType" type="bo:nameType" />
                <xsd:element name="metaData" type="bo:businessObject" />
            </xsd:sequence>
        </xsd:complexType>
    </xsd:element>
</xsd:schema>
```

In the foregoing description, for the purposes of illustration, methods were described in a particular order. It should be appreciated that the methods may be performed in a different order than that described. Additionally, unless indicated otherwise the methods may contain additional steps or omit steps described herein. The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more computer-readable storage media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. The methods also may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method for providing searchable data within a system containing multiple enterprise applications, comprising:

establishing, by a computer system, a first connection to a first application in the system;

using, by the computer system, the first connection, receiving information identifying searchable data associated with the first application;

generating, by the computer system, a first searchable data definition for the first application;

adding, by the computer system, an identification of one or more database objects including searchable data associated with the first searchable data definition to the first searchable definition and adding searchable attributes of the one or more database objects to the first searchable definition;

adding, by the computer system, metadata describing the searchable data to the first searchable data definition;

storing, by the computer system, the first searchable data definition;

validating, by the computer system, the first searchable data definition by performing a partial search of the associated data to verify that relationships identified or defined in the first searchable data definition are consistent with relationships stored within the first application;

based on validation of the first searchable data definition, establishing, by the computer system, a second connection to a second application in the system, using, by the computer system, the second connection, receiving information identifying searchable data associated with the second application; and adding, by the computer system, metadata describing the searchable data associated with the second application to the first searchable data definition;

wherein the first searchable data definition identifies the searchable data associated with the first and second applications and the locations of the searchable data associated with the first and second applications.

2. The method of claim 1, further comprising, based on metadata stored in the first searchable data definition, extracting, by the computer system, searchable data from the first application.

3. The method of claim 1, further comprising performing, by the computer system, a diagnostic verification of the searchable data stored in the first application using the first searchable data definition.

4. The method of claim 3, wherein the diagnostic verification is performed in real time.

5. The method of claim 1, further comprising indexing, by the computer system, the searchable data in the first application based on the first searchable data definition.

6. The method of claim 1, further comprising:
adding, by the computer system, metadata describing the searchable data associated with the second application to a second searchable data definition; and
storing, by the computer system, the second searchable data definition in the second application;
wherein the second searchable data definition identifies the searchable data associated with the first and second applications and the locations of the searchable data associated with the first and second applications.

7. The method of claim 6, further comprising:
using, by the computer system, the first and second searchable data definitions, performing a diagnostic search of searchable data stored in the first and second applications using the first and second searchable data definitions.

8. The method of claim 7, wherein the diagnostic search is performed in real time.

9. A computer-implemented method for indexing searchable data stored in a system having multiple enterprise applications, comprising:
using one or more common protocols, communicating, by a computer system, with the applications to identify searchable data stored by the applications, the searchable data corresponding to a plurality of objects stored by the applications, the searchable data comprising searchable data associated with a first application and searchable data associated with a second application;
creating, by the computer system, searchable data definitions comprising metadata identifying one or more locations of the searchable data stored by the applications, the searchable data definitions comprising a first searchable data definition for the first application;
adding, by the computer system, an identification of one or more database objects including searchable data associated with the first searchable data definition to the first searchable definition and adding searchable attributes of the one or more database objects to the first searchable definition;
adding, by the computer system, metadata describing the searchable data associated with the first and second applications to the first searchable data definition, wherein the first searchable data definition identifies the searchable data associated with the first and second applications and the locations of the searchable data associated with the first and second applications;
validating, by the computer system, the first searchable data definition by performing a partial search of the associated data to verify that relationships identified or defined in the first searchable data definition are consistent with relationships stored within the first application; and
based on validation of the first searchable data definition, using the searchable data definitions, indexing, by the computer system, the searchable data stored by the applications.

10. The method of claim 9, wherein each application provides a communication end point adapted to communicate using the one or more common protocols, the communication end point providing an interface to data stored in the application.

11. The method of claim 9, further comprising:
running, by the computer system, a diagnostic query on the searchable data described in the searchable data definitions using a search modeler in communication with the applications.

12. The method of claim 11, wherein the search modeler communicates with each application using one or more common protocols.

13. The method of claim 11, wherein the diagnostic query is run in real time.

14. A system comprising:
a plurality of processors configured to execute a plurality of enterprise applications including first and second applications, each application having a relational data store storing searchable data and non-searchable data;
a plurality of communication points, each communication point associated with one of the applications and configured to provide a standardized interface to the internal structure of data stored in the data store of the associated application; and
a search modeler in communication with each of the communication points, the search modeler comprising a processor configured to:
create searchable data definitions that identify searchable data in each data store; the searchable data definitions comprising a first searchable data definition for the first application;
add metadata describing the searchable data associated with the first and second applications to the first searchable data definition, wherein the first searchable data definition identifies the searchable data associated with the first and second applications and the locations of the searchable data associated with the first and second applications;
add an identification of one or more database objects including searchable data associated with the first searchable data definition to the first searchable definition and adding searchable attributes of the one or more database objects to the first searchable definition;
validate the first searchable data definition by performing a partial search of the associated data to verify that relationships identified or defined in the first searchable data definition are consistent with relationships stored within the first application; and based on validation of the first searchable data definition, use the searchable data definitions to index the searchable data stored by the first and second applications.

15. The system of claim 14, further comprising a search crawler comprising a processor configured to extract searchable data using the searchable data definitions.

16. The system of claim 14, further comprising a search engine comprising a processor configured to index searchable data extracted by the search crawler.

17. The system of claim 14, wherein the processor of the search modeler is further configured to perform a diagnostic verification of the metadata stored in the searchable data definitions.

18. The system of claim 17, wherein the diagnostic search is performed in real time.

19. The method of claim 1, further comprising adding, by the computer system, user access and security controls to the first searchable data definition by integrating the searchable data definition with pre-existing user access and security controls to restrict access to data associated with the one or more database objects in accordance with the user access and security controls and the pre-existing user access and security controls.

20. The method of claim 1, further comprising adding, by the computer system, artifacts to the first searchable data definition, wherein the artifacts include crawl trigger events and relationships between the one or more database objects.

* * * * *

UNITED STATES PATENT AND TRADEMARK OFFICE
CERTIFICATE OF CORRECTION

PATENT NO. : 8,219,572 B2  
APPLICATION NO. : 12/201308  
DATED : July 10, 2012  
INVENTOR(S) : Ghosh et al.

Page 1 of 1

It is certified that error appears in the above-identified patent and that said Letters Patent is hereby corrected as shown below:

On the title page, in column 2, under "Assistant Examiner", line 1, delete "Tuan-Hanh Phan" and insert -- Tuan-Khanh Phan --, therefor.

On page 2, in column 2, under "Other Publications", line 21, delete "Vocabolary" and insert -- Vocabulary --, therefor.

On page 2, in column 2, under "Other Publications", line 36, delete "1Og" and insert -- 10g --, therefor.

On page 2, in column 2, under "Other Publications", line 39, delete "1122-2011," and insert -- 11-22-2011, --, therefor.

In column 1, line 21, delete "2008 the" and insert -- 2008, the --, therefor.

In column 1, line 50, delete "Enterpriseone," and insert -- EnterpriseOne, --, therefor.

In column 3, line 7, delete "FIG. 3," and insert -- FIG. 3 --, therefor.

In column 3, line 30, delete "the a" and insert -- a --, therefor.

In column 9, line 11, delete "Locaction" and insert -- Location --, therefor.

In column 23, line 61, delete "business object" and insert -- data definition --, therefor.

Signed and Sealed this  
Second Day of October, 2012

David J. Kappos  
*Director of the United States Patent and Trademark Office*